US011265138B2

(12) United States Patent
Liu et al.

(10) Patent No.: US 11,265,138 B2
(45) Date of Patent: Mar. 1, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Liqing Liu, Sakai (JP); Shouichi Suzuki, Sakai (JP); Wataru Ohuchi, Sakai (JP); Tomoki Yoshimura, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 92 days.

(21) Appl. No.: 16/645,808

(22) PCT Filed: Sep. 11, 2018

(86) PCT No.: PCT/JP2018/033707
§ 371 (c)(1),
(2) Date: Mar. 10, 2020

(87) PCT Pub. No.: WO2019/054388
PCT Pub. Date: Mar. 21, 2019

(65) Prior Publication Data
US 2020/0280427 A1 Sep. 3, 2020

(30) Foreign Application Priority Data

Sep. 14, 2017 (JP) .............................. JP2017-176818

(51) Int. Cl.
*H04W 4/00* (2018.01)
*H04L 5/02* (2006.01)
*H04L 5/00* (2006.01)

(52) U.S. Cl.
CPC .............. *H04L 5/023* (2013.01); *H04L 5/001* (2013.01); *H04L 5/0053* (2013.01); *H04L 5/0055* (2013.01)

(58) Field of Classification Search
CPC ....... H04L 5/023; H04L 5/001; H04L 5/0053; H04L 5/0055; H04L 27/2602;
(Continued)

(56) References Cited

U.S. PATENT DOCUMENTS

2015/0200752 A1* 7/2015 Yin ....................... H04L 5/1469
370/280
2018/0295540 A1* 10/2018 Akkarakaran ...... H04W 72/042

FOREIGN PATENT DOCUMENTS

EP 2 445 279 A1 4/2012

OTHER PUBLICATIONS

Intel, "UL data transmission procedures in NR", R1-1716323, Sep. 18-21, 2017. (From Applicant's IDS) (Year: 2017).*
(Continued)

*Primary Examiner* — Mang Hang Yeung
(74) *Attorney, Agent, or Firm* — ScienBiziP, P.C.

(57) ABSTRACT

A terminal apparatus capable of efficiently performing the uplink and/or downlink communication is provided. The terminal apparatus receives higher layer signaling used for configuration of multiple scheduling request configurations, and transmits HARQ-ACK bits and scheduling request bits by using a HARQ-ACK PUCCH resource. Each of the multiple scheduling request configurations corresponds to one or more logical channels. Each of the multiple scheduling request configurations includes an SR PUCCH resource. The scheduling request bits are added to a sequence of the HARQ-ACK bits. In a case that the HARQ-ACK PUCCH resource and SR PUCCH resource overlap with each other in a time domain, a size of the scheduling
(Continued)

request bits is given based on a number of scheduling request configurations with the overlapping SR PUCCH resource.

4 Claims, 12 Drawing Sheets

(58) Field of Classification Search
CPC ... H04L 5/0051; H04L 5/0094; H04L 1/1812; H04L 1/1861; H04L 1/0073; H04L 1/1671; H04W 72/0413
USPC .......................................................... 370/330
See application file for complete search history.

(56) References Cited

OTHER PUBLICATIONS

NTT DOCOMO, Inc., "Scheduling request design in NR system", R1-1713951, Sep. 21-25, 2017. (From Applicant's IDS) (Year: 2017).*

NTT DOCOMO, Inc., "New SID Proposal: Study on New Radio Access Technology", RP-160671, Mar. 7-10, 2016. (From Applicant's IDS) (Year: 2016).*

Intel Corporation, "UL data transmission procedures in NR", 3GPP TSG RAN WG1 Meeting NR#3, R1-1716323, Sep. 18-21, 2017, pp. 1-9.

NTT DOCOMO, Inc., "Scheduling request design in NR system", 3GPP TSG RAN WG1 Meeting #90, R1-1713951, Aug. 21-25, 2017, pp. 1-3.

NTT DOCOMO, "New SID Proposal: Study on New Radio Access Technology", 3GPP TSG RAN Meeting #71, RP-160671, Mar. 7-10, 2016, 8 pages.

Samsung, "Procedures for UL Transmissions", R1-1716007, 3GPP TSG RAN WG1 Meeting NR#3, Nagoya, Japan, Sep. 18-21, 2017.

Nokia et al., "Remaining details of short PUCCH for UCI up to 2 bits", R1-1716139, 3GPP TSG RAN WG1 NR Ad-Hoc #3, Nagoya, Japan, Sep. 18-21, 2017.

Huawei et al., "Resource allocation and transmit diversity for PUCCH", R1-1715405, 3GPP TSG RAN WG1 Meeting AH_NR#3, Nagoya, Japan, Sep. 18-21, 2017.

* cited by examiner

SR#0 PUCCH resource

SR#1 PUCCH resource

HARQ-ACK PUCCH resource

SR#0 PUCCH resource

SR#1 PUCCH resource

SR#2 PUCCH resource

HARQ-ACK PUCCH resource (a)

| Code point | SR#0 | SR#1 | SR#2 |
|---|---|---|---|
| 00 | Negative | Negative | Negative |
| 01 | Negative | Negative | Positive |
| 10 | Negative | Positive | Negative |
| 11 | Positive | Negative | Negative |

(b)

| Code point | SR#0 | SR#1 | SR#2 |
|---|---|---|---|
| 00 | Negative | Negative | Negative |
| 01 | Negative | Negative | Positive |
| 10 | Negative | Positive | Any |
| 11 | Positive | Any | Any |

| Code point | SR#0 | SR#2 |
|---|---|---|
| 00 | Negative | Negative |
| 01 | Negative | Positive |
| 10 | Positive | Negative |
| 11 | - | - |

(b)

| Code point | SR#0 | SR#1 | SR#2 |
|---|---|---|---|
| 00 | Negative | Negative | Negative |
| 01 | Negative | Negative | Positive |
| 10 | Positive | Negative | Negative |
| 11 | - | - | - |

FIG. 10

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple cells.

In the 3GPP, for proposal to International Mobile Telecommunication (IMT)-2020, which is a standard for next-generation mobile communication system developed by the International Telecommunication Union (ITU), a next-generation standard (New Radio (NR)) has been studied (NPL 1). The NR has been requested to meet requirements assuming three scenarios: enhanced Mobile BroadBand (eMBB), massive Machine Type Communication (mMTC), and Ultra Reliable and Low Latency Communication (URLLC) in a single technology framework.

For NR, a study has been made regarding multiple scheduling request configurations (NPL 2). Multiple scheduling request configurations are configured for data of different services. A scheduling request for a scheduling request configuration is used to request a UL-SCH resource for an initial transmission of data.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7th-10th Mar., 2016.

NPL 2: "Scheduling request design in NR system," R1-1713951, NTT docomo, Prague, Czech Republic, 21th-25th Aug., 2017.

SUMMARY OF INVENTION

Technical Problem

However, specific methods for scheduling request bits corresponding to multiple scheduling request configurations and transmission have not been fully studied.

The present invention has been made in view of above, and provided are a terminal apparatus capable of efficiently performing the uplink and/or downlink communication, a communication method used for the terminal apparatus, an integrated circuit implemented by the terminal apparatus, a base station apparatus capable of efficiently performing the uplink and/or downlink communication, a communication method used for the base station apparatus, and an integrated circuit implemented by the base station apparatus.

Solution to Problem (1) According to some aspects of the present invention, the following measures are provided. Specifically, a first aspect of the present invention is a terminal apparatus including: a receiver configured to receive higher layer signaling used for configuration of multiple scheduling request configurations; and a transmitter configured to transmit HARQ-ACK bits and scheduling request bits by using a PUCCH format and a PUCCH resource used for transmission of a HARQ-ACK, wherein each of the multiple scheduling request configurations includes an SR PUCCH resource, in a case that the PUCCH resource used for transmission of the HARQ-ACK and one or multiple SR PUCCH resources corresponding to K scheduling request configuration(s) of the multiple scheduling request configurations overlap with each other in a time domain, a value of a size L of the scheduling request bits is given based on Ceiling ($\log_2(K+1)$), and the scheduling request bits are added to a sequence of the HARQ-ACK bits.

(2) A second aspect of the present invention is a base station apparatus including: a transmitter configured to transmit higher layer signaling used for configuration of multiple scheduling request configurations; and a receiver configured to receive HARQ-ACK bits and scheduling request bits by using a PUCCH format and a PUCCH resource used for transmission of a HARQ-ACK, wherein each of the multiple scheduling request configurations includes an SR PUCCH resource, in a case that the PUCCH resource used for transmission of the HARQ-ACK and one or multiple SR PUCCH resources corresponding to K scheduling request configuration(s) of the multiple scheduling request configurations overlap with each other in a time domain, a value of a size L of the scheduling request bits is given based on Ceiling ($\log_2(K+1)$), and the scheduling request bits are added to a sequence of the HARQ-ACK bits.

(3) A third aspect of the present invention is a communication method for a terminal apparatus, the communication method including the steps of: receiving higher layer signaling used for configuration of multiple scheduling request configurations; and transmitting HARQ-ACK bits and scheduling request bits by using a PUCCH format and a PUCCH resource used for transmission of a HARQ-ACK, wherein each of the multiple scheduling request configurations includes an SR PUCCH resource, in a case that the PUCCH resource used for transmission of the HARQ-ACK and one or multiple SR PUCCH resources corresponding to K scheduling request configuration(s) of the multiple scheduling request configurations overlap with each other in a time domain, a value of a size L of the scheduling request bits is given based on Ceiling ($\log_2(K+1)$), and the scheduling request bits are added to a sequence of the HARQ-ACK bits.

(4) A fourth aspect of the present invention is a communication method for a base station apparatus, the communication method including the steps of: transmitting higher layer signaling used for configuration of multiple scheduling request configurations; and receiving HARQ-ACK bits and scheduling request bits by using a PUCCH format and a PUCCH resource used for transmission of a HARQ-ACK, wherein each of the multiple scheduling request configurations includes an SR PUCCH resource, in a case that the PUCCH resource used for transmission of the HARQ-ACK and one or multiple SR PUCCH resources corresponding to K scheduling request configuration(s) of the multiple scheduling request configurations overlap with each other in a time domain, a value of a size L of the scheduling request bits is given based on Ceiling ($\log_2(K+1)$), and the scheduling request bits are added to a sequence of the HARQ-ACK bits.

Advantageous Effects of Invention

According to the present invention, the terminal apparatus can efficiently perform uplink and/or downlink communication. The base station apparatus can efficiently perform uplink and/or downlink communication.

BRIEF DESCRIPTION OF DRAWINGS

FIG. 8 is a diagram illustrating an example of a correspondence table between information of scheduling requests and code points according to the present embodiment.

FIG. 10 is a diagram illustrating another example of a correspondence table between information of scheduling requests and code points according to the present embodiment.

DESCRIPTION OF EMBODIMENTS

Embodiments of the present invention will be described below. The description "given" included in the following description may be interpreted as "determined" or "configured".

Figure 1:
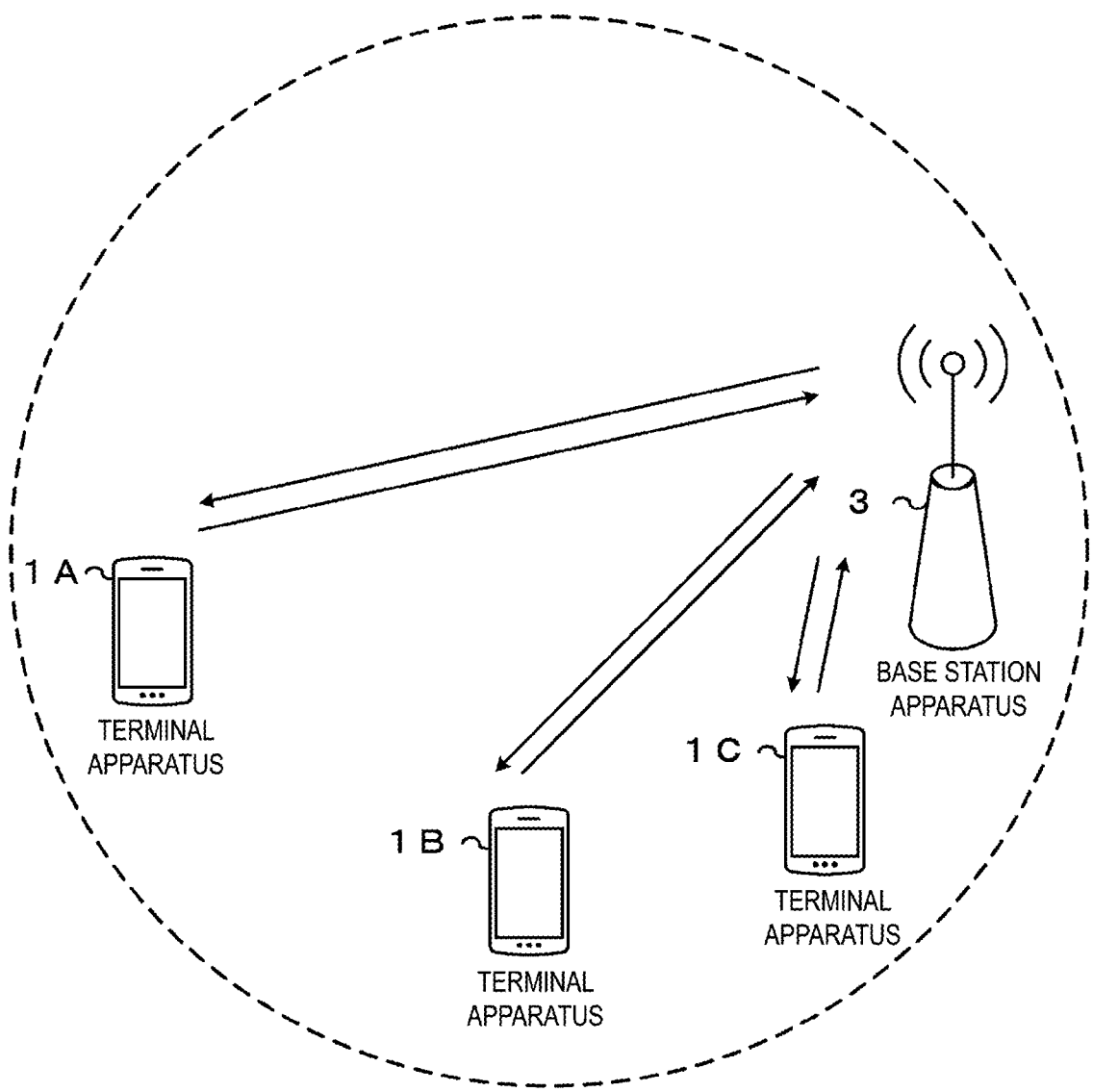
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are also referred to as a terminal apparatus 1.

Carrier aggregation will be described below.

In the present embodiment, one or multiple serving cells are configured for the terminal apparatus 1. A technique in which the terminal apparatus 1 communicates via multiple serving cells is referred to as cell aggregation or carrier aggregation. The multiple serving cells may include one primary cell and one or more secondary cells. The primary cell is a serving cell in which an initial connection establishment procedure has been performed, a serving cell in which a connection re-establishment procedure has been started, or a cell indicated as a primary cell in a handover procedure. The primary cell may be a cell used for the transmission in the PUCCH. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can simultaneously perform transmission and/or reception of multiple physical channels on multiple serving cells (component carriers). One physical channel is transmitted on one serving cell (component carrier) of multiple serving cells (component carriers).

Here, the base station apparatus 3 may configure one or multiple serving cells through higher layer signaling (for example, RRC signaling, RRC information). For example, one or multiple secondary cells may be configured to form a set of multiple serving cells with a primary cell. In the present embodiment, carrier aggregation is applied to the terminal apparatus 1, unless stated otherwise. The terminal apparatus 1 performs transmission and/or reception of channels in multiple serving cells.

In the uplink configured with carrier aggregation, one independent HARQ entity exists for each serving cell (uplink component carrier). In the uplink configured with carrier aggregation, one independent HARQ entity exists in the MAC entity for each serving cell (uplink component carrier). The HARQ entity manages multiple HARQ processes in parallel. The HARQ process relates to a HARQ buffer. In other words, the HARQ entity relates to multiple HARQ buffers. The HARQ process stores data of the MAC layer in the HARQ buffer. The HARQ process indicates a physical layer to transmit the data of the MAC layer.

An example of a configuration of a radio frame according to the present embodiment will be described below.

Figure 2:
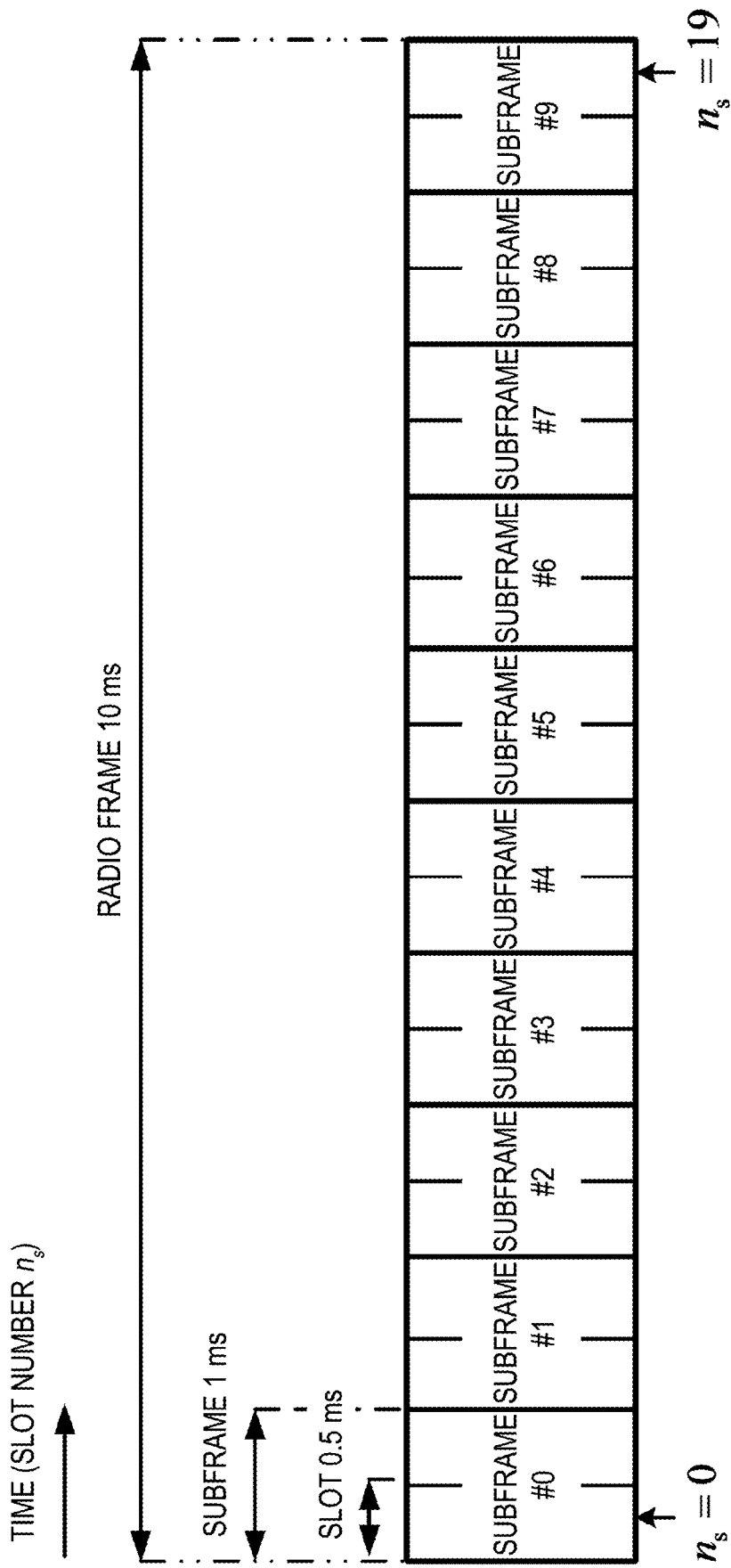
FIG. 2 is an example illustrating configurations of a radio frame, subframes, and slots according to one aspect of the present embodiment.

FIG. 2 is an example illustrating configurations of a radio frame, subframes, and slots according to one aspect of the present embodiment. In one example illustrated in FIG. 2, the length of the slot is 0.5 ms, the length of the subframe is 1 ms, and the length of the radio frame is 10 ms. The slot may be a unit for resource allocation in the time domain. The slot may be a unit for mapping of one transport block. The transport block may be mapped to one slot. The transport block may be a unit of data to be transmitted in a prescribed interval (for example, Transmission Time Interval (TTI)) defined in a higher layer (for example, Mediam Access Control (MAC)).

The length of the slot may be given according to the number of OFDM symbols. For example, the number of OFDM symbols may be 7 or 14. The length of the slot may be given based on at least the length of the OFDM symbol.

The length of the OFDM symbol may be given based on at least the second subcarrier spacing. The length of the OFDM symbol may be given based on at least the number of points of Fast Fourier Transform (FFT) used to generate the OFDM symbol. The length of the OFDM symbol may include a length of a Cyclic Prefix (CP) added to the OFDM symbol. Here, the OFDM symbol may be referred to as a symbol. In a case that a communication method other than OFDM is used in communications between the terminal apparatus 1 and the base station apparatus 3 (for example, in the use of SC-FDMA, DFT-s-OFDM, or the like), the generated SC-FDMA symbol and/or DFT-s-OFDM symbol is also referred to as an OFDM symbol. In other words, the OFDM symbol may include a DFT-s-OFDM symbol and/or a SC-FDMA symbol. For example, the length of the slot may be 0.25 ms, 0.5 ms, 1 ms, 2 ms, or 3 ms. The OFDM may include SC-FDMA or DFT-s-OFDM.

The OFDM includes a multi-carrier communication method applying waveform shaping (Pulse Shape), PAPR reduction, out-of-band radiation reduction, or filtering, and/or phase processing (for example, phase rotation and the like). The multi-carrier communication method may be a communication method that generates/transmits a signal in which multiple subcarriers are multiplexed.

The length of the subframe may be 1 ms. The length of the subframe may be given based on a first subcarrier spacing. For example, in a case of the first subcarrier spacing of 15 kHz, the length of the subframe may be 1 ms. The subframe may include one or more slots. For example, the subframe may include two slots.

The radio frame may include multiple subframes. The number of subframes for the radio frame may be, for example, 10. The radio frame may include multiple slots. The number of slots for the radio frame may be, for example, 10.

Physical channels and physical signals according to various aspects of the present embodiment will be described. The terminal apparatus may transmit a physical channel and/or a physical signal. The base station apparatus may transmit a physical channel and/or a physical signal.

The downlink physical channel and the downlink physical signal are also referred to as a downlink signal. The uplink physical channel and the uplink physical signal are also referred to as an uplink signal. The downlink physical channel and the uplink physical channel are also referred to as a physical channel. The downlink physical signal and the uplink physical signal are also referred to as a physical signal.

In uplink radio communication from the terminal apparatus 1 to the base station apparatus 3, the following uplink physical signal may be used. The uplink physical signal need not be used for transmitting information output from the higher layer, but is used by the physical layer.

Uplink Reference Signal (UL RS)

According to the present embodiment, at least the following two types of uplink reference signals may be used.

Demodulation Reference Signal (DMRS)
Sounding Reference Signal (SRS)

The DMRS is associated with transmission of the PUSCH or the PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. The SRS may be associated with transmission of the PUSCH and/or the PUCCH. The base station apparatus 3 may use the SRS to measure the channel state. The SRS may be transmitted at the end of the subframe in an uplink slot or at an OFDM symbol of a prescribed number from the end.

The following downlink physical channels may be used for the downlink radio communication from the base station apparatus 3 to the terminal apparatus 1. The downlink physical channels may be used by the physical layer in order to transmit information output from the higher layer.

Physical Broadcast Channel (PBCH)
Physical Downlink Shared Channel (PDSCH)
Physical Downlink Control Channel (PDCCH)

The PBCH is used for broadcasting a Master Information Block (MIB, a Broadcast Channel (BCH)) that is commonly used by the terminal apparatuses 1. The PBCH may be transmitted based on a prescribed transmission interval. For example, the PBCH may be transmitted at an interval of 80 ms. At least a part of information included in the PBCH may be updated at every 80 ms. The PBCH may include 288 subcarriers. The PBCH may include 2, 3, or 4 OFDM symbols. The MIB may include information relating to an identifier (index) of a synchronization signal. The MIB may include information for indicating at least a part of: the number of the slot in which PBCH is transmitted; the number of the subframe in which PBCH is transmitted; and the number of the radio frame in which PBCH is transmitted. The first configuration information may be included in the MIB. The first configuration information may be configuration information used for at least some or all of random access message 2, random access message 3, and random access message 4.

The PDSCH is used to transmit downlink data (TB, MAC PDU, DL-SCH, PDSCH, CB, CBG). The PDSCH is at least used to transmit random access message 2 (random access response). The PDSCH is at least used to transmit the system information including parameters used for initial access.

The PDCCH is used to transmit Downlink Control Information (DCI). The downlink control information is also referred to as a DCI format. The downlink control information may include at least either a downlink grant or an uplink grant. The downlink grant is also referred to as a downlink assignment or a downlink allocation. The uplink grant and the downlink grant are also collectively referred to as a grant.

A single downlink grant is used for at least scheduling of a PDSCH within a serving cell. The downlink grant may be used for at least scheduling of the PDSCH within the same slot as the slot in which the downlink grant has been transmitted.

A single uplink grant may be used for at least scheduling of a PUSCH within a serving cell.

For example, the downlink control information may include a New Data Indicator (NDI). The new data indicator may be used to at least indicate whether the transport block corresponding to the new data indicator is an initial transmission or not. The new data indicator may correspond to a prescribed HARQ process number, may correspond to the transport block transmitted immediately before and the HARQ process number, and may be information indicating whether or not the transport block included in the PDSCH and/or the PUSCH scheduled by the downlink control information including the new data indicator is the same.

The HARQ process number is a number used to identify the HARQ process. The HARQ process number may be included in the downlink control information. The HARQ process is a process for managing a HARQ. The new data indicator may correspond to a prescribed HARQ process number, the transmission of the transport block included in the PDSCH and/or the PUSCH scheduled by the downlink control information including the new data indicator may correspond to the prescribed HARQ process number, and may indicate whether or not it is the retransmission of the transport block included in the PDSCH and/or PUSCH transmitted immediately before. Whether or not the transmission of the transport block included in the PDSCH and/or the PUSCH scheduled by the downlink control information is retransmission of the transport block transmitted immediately before may be given based on whether or not the new data indicator is switched (or toggled) relative to a new data indicator corresponding to the transport block transmitted immediately before.

In other words, the new data indicator indicates an initial transmission or retransmission. The HARQ entity of the terminal apparatus 1 indicates to a certain HARQ process to trigger an initial transmission in a case that a new data indicator provided by HARQ information is toggled relative to a value of a new data indicator for a previous transmission of the certain HARQ process. The HARQ entity indicates to a certain HARQ process to trigger retransmission in a case that a new data indicator provided by HARQ information is not toggled relative to a value of a new data indicator for a previous transmission of the certain HARQ process. Note that the HARQ process may determine whether the new data indicator is toggled.

For the downlink radio communication, the following downlink physical signals may be used. Although the downlink physical signal need not be used for transmission of information output from a higher layer, the downlink physical signal may be used in the physical layer.

Synchronization signal (SS)
Downlink Reference Signal (DL RS)

The synchronization signal is used for the terminal apparatus 1 to establish synchronization in a frequency domain and a time domain in the downlink. The synchronization signal includes at least Primary Synchronization Signal (PSS) and Second Synchronization Signal (SSS).

The synchronization signal may be transmitted with an ID (cell ID) of the target cell included therein. The synchronization signal may be transmitted with a sequence generated based on at least the cell ID included therein. The synchronization signal including the cell ID may mean that a sequence of synchronization signals is provided based on the cell ID. The synchronization signal may be transmitted with a beam (or precoder) applied thereto.

The beam exhibits a phenomenon that antenna gain varies according to the direction. The beam may be provided based on at least the directivity of the antenna. The beam may be provided based on at least the phase shift of the carrier signal. The beam may be provided by application of a precoder.

The downlink reference signal is used at least for the terminal apparatus 1 to perform channel compensation on a downlink physical channel. The downlink reference signal is used at least for the terminal apparatus 1 to obtain the downlink channel state information.

According to the present embodiment, the following two types of downlink reference signals are used.
DeModulation Reference Signal (DMRS)
Shared Reference Signal (Shared RS)

The DMRS is associated with transmission of the PDCCH and/or the PDSCH. The DMRS is multiplexed with the PDCCH or the PDSCH. In order to perform channel compensation of the PDCCH or the PDSCH, the terminal apparatus 1 may use the DMRS corresponding to the PDCCH or the PDSCH. Hereinafter, the transmission of the PDCCH and the DMRS corresponding to the PDCCH together is simply referred to as transmission of the PDCCH. Hereinafter, the transmission of the PDSCH and the DMRS corresponding to the PDSCH together is simply referred to as transmission of the PDSCH.

The Shared RS may be associated at least with transmission of the PDCCH. The Shared RS may be multiplexed with the PDCCH. The terminal apparatus 1 may use the Shared RS to perform channel compensation of the PDCCH. Hereinafter, the transmission of the PDCCH and the Shared RS together is also simply referred to as transmission of the PDCCH.

The DMRS may be an RS which is individually configured for the terminal apparatus 1. The sequence of DMRS may be provided based on at least parameters individually configured for the terminal apparatus 1. The DMRS may be individually transmitted for the PDCCH and/or the PDSCH. On the other hand, the Shared RS may be an RS which is commonly configured for multiple terminal apparatuses 1. The sequence of Shared RS may be provided regardless of parameters individually configured for the terminal apparatus 1. For example, the Shared RS sequence may be given based on at least some of the slot number, the mini-slot number, or a cell ID (identity). The Shared RS may be RS transmitted regardless of whether the PDCCH and/or the PDSCH is transmitted.

The BCH, the UL-SCH, and the DL-SCH described above are transport channels. The channel used in the Medium Access Control (MAC) layer is referred to as a transport channel. The unit of transport channels used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 may exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. The base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 through the PDSCH may be RRC signaling common to the multiple terminal apparatuses 1 in a cell. The RRC signaling common to the multiple terminal apparatuses 1 in the cell is also referred to as common RRC signaling. The RRC signaling transmitted from the base station apparatus 3 through the PDSCH may be RRC signaling dedicated to a certain terminal apparatus 1 (also referred to as dedicated signaling or UE specific signaling). The RRC signaling dedicated to the terminal apparatus 1 is also referred to as dedicated RRC signaling. A cell-specific parameter may be transmitted by using the RRC signaling common to the multiple terminal apparatuses 1 in the cell or the RRC signaling dedicated to the certain terminal apparatus 1. A UE-specific parameter may be transmitted by using the RRC signaling dedicated to the certain terminal apparatus 1.

Broadcast Control CHannel (BCCH), Common Control CHannel (CCCH), and Dedicated Control CHaneel (DCCH) are logical channels. For example, the BCCH is a higher layer channel used to transmit the MIB. The BCCH is a higher layer channel used to transmit the system information. Note that the system information may include System Information Block type 1 (SIB1). The system information may include a System Information (SI) message including System Information Block type 2 (SIB2). The Common Control Channel (CCCH) is a higher layer channel used to transmit information common to the multiple terminal apparatuses 1. Here, the CCCH is used for the terminal apparatus 1 which is not in an RRC-connected state, for example. The Dedicated Control Channel (DCCH) is a higher layer channel used to transmit individual control information (dedicated control information) to the terminal apparatus 1. Here, the DCCH is used for the terminal apparatus 1 which is in an RRC-connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

For the uplink radio communication from the terminal apparatus 1 to the base station apparatus 3, at least the following uplink physical channels may be used. The uplink physical channel may be used by the physical layer in order to transmit information output from a higher layer.

Physical Uplink Shared Channel (PUSCH)
Physical Random Access Channel (PRACH)
Physical Uplink Control Channel (PUCCH)

The PUSCH is used to transmit uplink data (TB, MAC PDU, UL-SCH, PUSCH, CB, CBG). The PUSCH may be used to transmit HARQ-ACK and/or channel state information together with the uplink data. The PUSCH may be used to transmit only the channel state information or to transmit only the HARQ-ACK and the channel state information. The PUSCH is used to transmit random access message 3.

The PRACH is used to transmit a random access preamble (random access message 1). The PRACH may be used for indicating at least some of initial connection establishment procedure, handover procedure, connection re-establishment procedure, synchronization (timing adjustment) for uplink data transmission, and a request for a PUSCH (UL-SCH) resource.

The PUCCH is used to transmit Uplink Control Information (UCI). The uplink control information includes Channel State Information (CSI) of a downlink channel, a Scheduling Request (SR) used to request a PUSCH (Uplink-Shared Channel (UL-SCH)) resource for initial transmission, and a Hybrid Automatic Repeat request ACKnowledgement (HARQ-ACK) for downlink data (Transport block (TB), Medium Access Control Protocol Data Unit (MAC PDU), Downlink-Shared Channel (DL-SCH), and Physical Downlink Shared Channel (PDSCH), code block (CB), code block Group (CBG)). The HARQ-ACK indicates an acknowledgement (ACK) or a negative-acknowledgement (NACK).

The HARQ-ACK is also referred to as an ACK/NACK, a HARQ feedback, a HARQ-ACK feedback, a HARQ response, a HARQ-ACK response, HARQ information, HARQ-ACK information, HARQ control information, and HARQ-ACK control information. In a case that the downlink data is successfully decoded, the ACK for the downlink data is generated. In a case that the downlink data is not successfully decoded, the NACK for the downlink data is generated. Discontinuous transmission (DTX) may mean that downlink data has not been detected. Discontinuous transmission (DTX) may mean that data for which a HARQ-ACK response is to be transmitted has not been detected. A PUCCH resource for a HARQ-ACK is also referred to as a HARQ-ACK PUCCH resource.

The Channel State Information (CSI) may include a Channel Quality Indicator (CQI) and a Rank Indicator (RI). The channel quality indicator may include a Precoder Matrix Indicator (PMI). The channel state information may include the precoder matrix indicator. The CQI is an indicator associated with channel quality (propagation strength), and the PMI is an indicator for indicating a precoder. The RI is an indicator for indicating a transmission rank (or the number of transmission layers).

The scheduling request includes a positive scheduling request or a negative scheduling request. The positive scheduling request indicates that the UL-SCH resource for the initial transmission is requested. The negative scheduling request indicates that the UL-SCH resource for the initial transmission is not requested. The terminal apparatus 1 may determine whether to transmit the positive scheduling request. The scheduling request being the negative scheduling request may mean that the terminal apparatus 1 has determined not to transmit the positive scheduling request. Note that the information of the scheduling request is information indicating whether the scheduling request is the positive scheduling request or the negative scheduling request for a certain scheduling request configuration.

The scheduling request configuration may be configured for the terminal apparatus 1 via higher layer signaling (RRC message, RRC information, RRC signaling). Note that the scheduling request configuration may include information (parameter) indicating the PUCCH resource for the scheduling request. The PUCCH resource for the scheduling request may be referred to as an SR PUCCH resource. Information indicating the PUCCH resource for the scheduling request may include information indicating allocation of the frequency domain and information indicating allocation of the time domain for the SR PUCCH resource. The information indicating allocation of the frequency domain for the SR PUCCH resource may be information indicating the PRB index to which the SR PUCCH resource is allocated. The information indicating allocation of the time domain for the SR PUCCH resource may be information indicating the offset (subframe offset, slot offset, symbol offset) of the period and the time domain. Note that the offset may be an offset in the time domain or may be an offset for the period. For example, the period may be defined in time, may be defined as the number of radio frames (in radio frame units), may be defined as the number of subframes (in subframe units), may be defined as the number of slots (in slot units), or may be defined as the number of OFDM symbols (in symbol units). Note that the offset may be defined in time, may be defined as the number of radio frames (in radio frame units), may be defined as the number of subframes (in subframe units), may be defined as the number of slots (in slot units), or may be defined as the number of OFDM symbols (in symbol units). Note that the information indicating allocation of the time domain for the SR PUCCH resource may be information indicating the transmission interval of the SR PUCCH resource (time unit, transmission timing).

The MAC entity may be configured with 0, 1, or more scheduling request configurations. In other words, the base station apparatus 3 may configure multiple scheduling request configurations (Multiple SR configurations) for the terminal apparatus 1 by using higher layer signaling. Information indicating the PUCCH resource for the scheduling request may be configured independently (individually) for each of the multiple scheduling request configurations. In other words, an SR PUCCH resource may be individually configured for each of the scheduling request configurations. Each of the multiple scheduling request configurations may correspond to one or more logical channels. Each of the logical channels may be mapped to one or more of the multiple scheduling request configurations, based on the configuration of higher layer signaling. Which scheduling request configuration is used in the multiple scheduling request configurations may be given based on the logical channel that triggers the scheduling request. Note that triggering of the scheduling request configuration may mean that a scheduling request is triggered for the scheduling request configuration. In a case that the scheduling request is triggered, the scheduling request is regarded to be pending until the scheduling request is canceled.

Logical channels may correspond to data transfer services. For example, each of the multiple logical channels may support the transfer of certain types of information. In other words, each of the logical channel types may be defined by which type of information is transferred.

Figure 3:
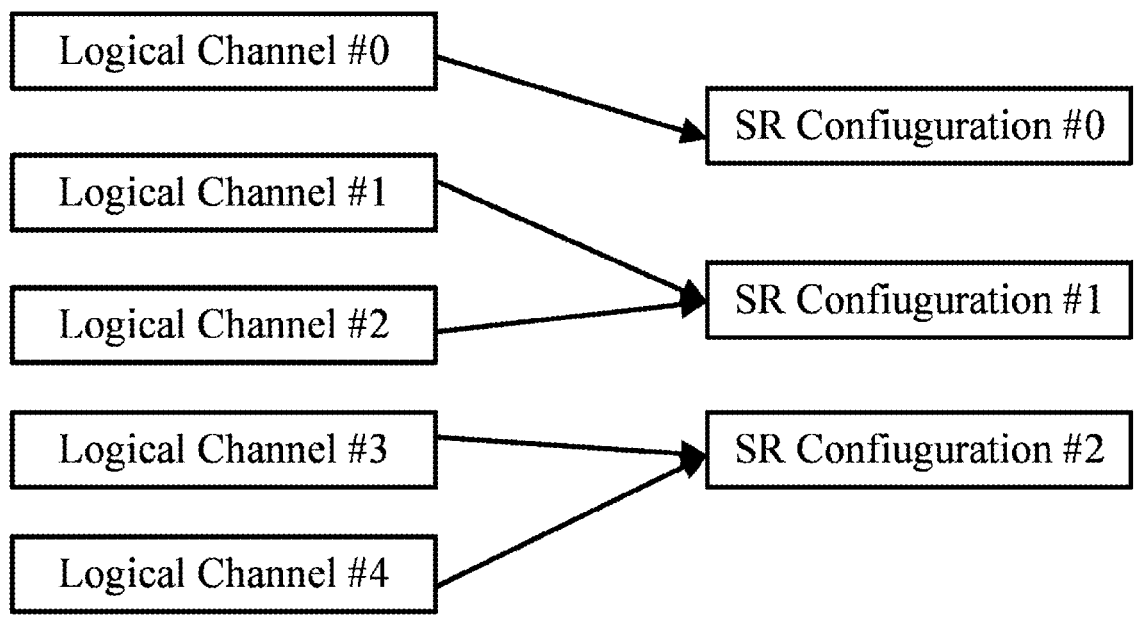
FIG. 3 is a diagram illustrating an example relationship of mapping between logical channels and scheduling request configurations according to the present embodiment.

FIG. 3 is a diagram illustrating an example relationship of mapping between logical channels and scheduling request configurations according to the present embodiment. FIG. 3 illustrates a case in which three scheduling request configurations are configured for the terminal apparatus 1. Each of the three scheduling request configurations corresponds to one or more logical channels. In FIG. 3, SR configuration #0 may correspond to logical channel #0. SR configuration #1 may correspond to logical channel #1 and logical channel #2. SR configuration #2 may correspond to logical channel #3 and logical channel 4. For example, in a case that the logical channel that triggers the scheduling request is logical channel #0, SR configuration #0 may be used. For example, in a case that the logical channel that triggers the scheduling request is logical channel #3, SR configuration #2 may be used. In other words, which scheduling request configuration is used can be given based on the corresponding logical channel.

In a case that multiple scheduling request configurations are configured, transmission of one or multiple scheduling requests (SR PUCCH resources) occurs in a certain time unit.

The base station apparatus 3 may configure a priority among multiple scheduling request configurations for each of the multiple scheduling request configurations configured for the terminal apparatus 1 via higher layer signaling. In a case that transmission of the multiple scheduling requests occurs (is triggered) in a certain time unit, based on the priority configured by higher layer signaling, the terminal apparatus 1 may perform transmission of the scheduling request by using the SR PUCCH resource for the scheduling request configuration having the highest priority.

The MAC layer may notify/indicate to the physical layer, based on the priority, which scheduling request corresponding to which scheduling request configuration to transmit for the transmission of the multiple scheduling requests that occurs (is triggered) in a certain time unit. In a case that the scheduling request is triggered simultaneously for each of the multiple scheduling request configurations in a certain time unit, the priority of the scheduling request configuration may mean processing to notify/indicate, to the physical layer, to which scheduling request configuration the MAC layer signals the scheduling request. In other words, in a case that the scheduling request is triggered simultaneously for each of the multiple scheduling request configurations in a certain time unit, the MAC layer may notify/indicate the physical layer to select the scheduling request configuration with the highest priority to signal the scheduling request among the multiple scheduling request configurations corresponding to the scheduling request triggered.

The priority of the scheduling request configuration may be linked to the priority of the logical channels corresponding to the scheduling request configurations. The priority of the scheduling request configuration may be given based on the indexes of the corresponding logical channels. For example, the priority of a scheduling request configuration with a smaller index among the corresponding logical channels may be higher. For example, the priority of the scheduling request configuration with a smaller index of the logical channel that triggers the scheduling request may be higher among the scheduling request configurations in which the scheduling request is triggered. The priority of the multiple scheduling request configurations may be implicitly given based on the indexes of the scheduling request configurations. For example, the priority of the scheduling request configuration with a smaller value of the index may be higher, or the priority of the scheduling request configuration with a larger smaller value of the index may be higher. The priority of the scheduling request configuration may be linked to the type of transfer data corresponding to the logical channel. The priority of the scheduling request configuration may be given based on subcarrier spacing used for transmission of data corresponding to the logical channel. For example, the priority of the logical channel with a larger value of the subcarrier spacing corresponding to the logical channel (the subcarrier spacing is larger or the slot period is shorter) may be higher. The priority of the scheduling request configuration may be given based on the number of OFDM symbols used for transmission of data corresponding to the logical channel. For example, the priority of the logical channel with a smaller number of OFDM symbols used for transmission of data (the transmission time of data is shorter) may be higher. In other words, the terminal apparatus 1 can determine the priority of the scheduling request configuration, based on the priority of the logical channel corresponding to the scheduling request configuration. The priority of the scheduling request configuration may be given based on the number of OFDM symbols of the PUCCH resource configured for the scheduling request configuration. For example, the priority of the scheduling request configuration with a smaller number of OFDM symbols of the PUCCH resource used for SR transmission may be higher.

In a case that the transmission of the multiple scheduling requests for the multiple scheduling request configurations is triggered in a certain time unit, the MAC layer may notify/indicate the physical layer to signal multiple scheduling requests. In this case, the terminal apparatus 1 may transmit another PUCCH resource corresponding to the multiple scheduling requests rather than the SR PUCCH resource corresponding to the multiple scheduling request configurations triggered. The PUCCH resource may be configured via higher layer signaling in advance. The PUCCH resource may be used to indicate the information of the positive scheduling request for the multiple scheduling request configurations triggered. The PUCCH resource may be used to transmit a scheduling request bit field constituted by multiple bits. The base station apparatus 3 may determine that the multiple scheduling requests corresponding to multiple respective scheduling request configurations are positive scheduling requests, based on detecting the transmission of the scheduling request in the PUCCH resource.

Figure 4:
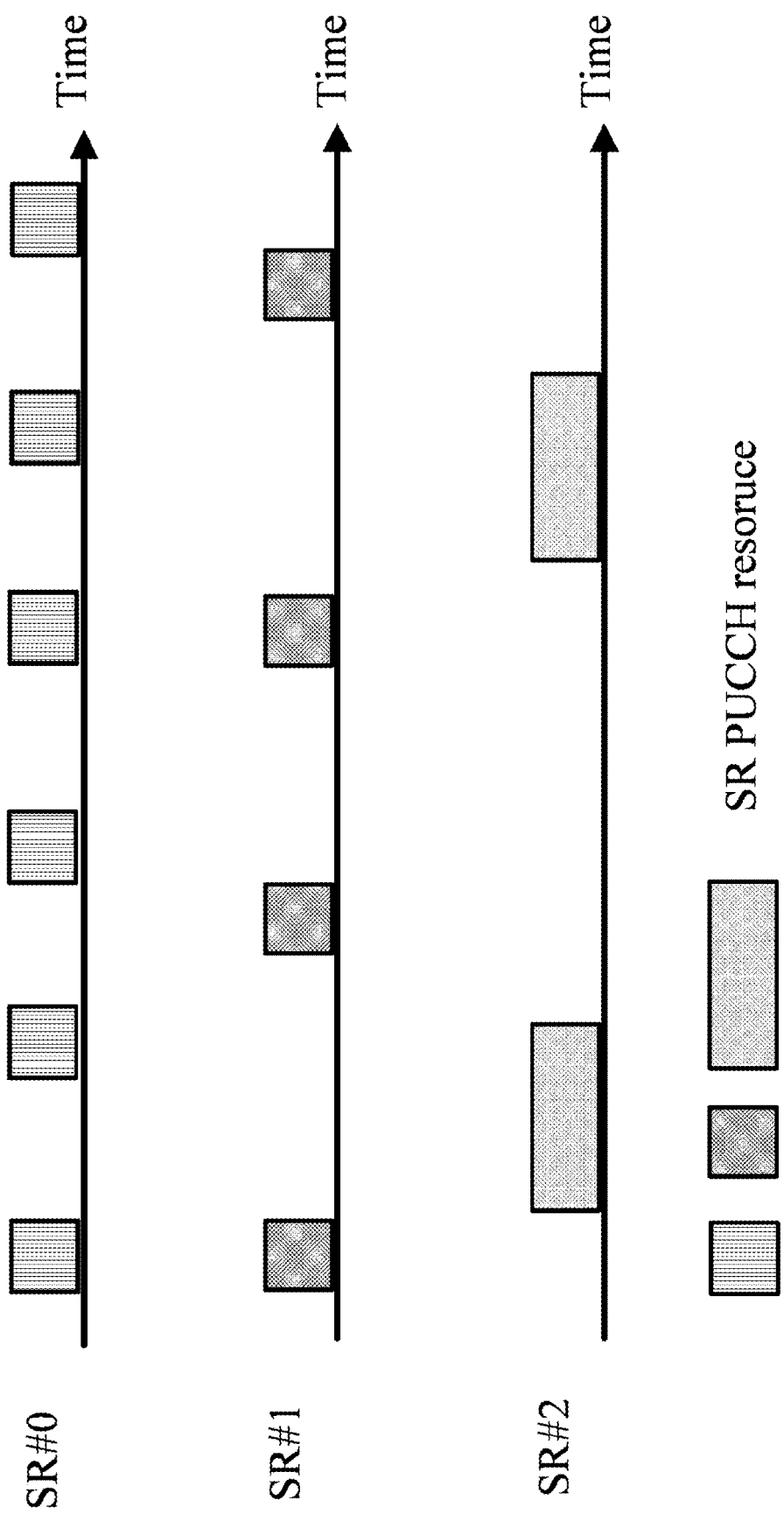
FIG. 4 is a diagram illustrating an example of configurations of scheduling request configurations according to the present embodiment.

FIG. 4 is a diagram illustrating an example of configurations of scheduling request configurations according to the present embodiment. In FIG. 4, three scheduling request configurations are configured for the terminal apparatus 1. In FIG. 4, three scheduling request configurations corresponds to SR #0, SR #1, and SR #2. #0, #1, and #2 are the indexes of the scheduling request configurations. For example, SR #0 with the lowest index may have the highest priority. SR #2 with the largest index may have the lowest priority. Each of SR #0, SR #1, and SR #2 includes a corresponding (associated) SR PUCCH resource. As illustrated in FIG. 4, the periods, offsets, and/or OFDM symbols of PUCCH resources for the scheduling requests may be configured differently for SR #0, SR #1, and SR #2. For example, in a case that a scheduling request is triggered for a certain scheduling request configuration, the terminal apparatus 1 may transmit the scheduling request by using the SR PUCCH resource included in (corresponding to) the scheduling request configuration.

PUCCH formats according to the present embodiment will be described below.

At least five types of PUCCH formats may be given. PUCCH format 0 PUCCH format 0 is a format of the PUCCH in which UCI is transmitted by selection of the sequence. In PUCCH format 0, a set of sequences for PUCCH format 0 is defined. The set of sequences for PUCCH format 0 includes one or more sequences for PUCCH format 0. Among the one or more sequences for PUCCH format 0, one sequence for PUCCH format 0 is selected based at least on a block of bits. The sequence for PUCCH format 0 selected is mapped to the uplink physical channel and transmitted. The block of bits may be given by the UCI. The block of bits may correspond to the UCI. In PUCCH format 0, the number of bits of the block of bits $M_{bit}$ may be less than 3. In PUCCH format 0, the number of OFDM symbols of the PUCCH may be 1 or 2. In PUCCH format 0, the number of OFDM symbols of the PUCCH may be 3.

The sequence for PUCCH format 0 selected may be multiplied by a prescribed power reducing factor (or amplitude reducing factor). The sequence for PUCCH format 0 selected is mapped in the ascending order in terms of k from the resource element (k, l) for PUCCH format 0. The prescribed power reducing factor is at least used for transmit power control. Here, k is an index of the frequency domain. l is the index of the time domain.

In other words, PUCCH format 0 may be used to transmit 1 bit or 2 bits of HARQ-ACK, or (if any) the UCI including the scheduling request. Information indicating the PUCCH resource used in PUCCH format 0 may include information about the RB index and the cyclic shift. In other words, different PUCCH resources may mean that either of the RB index and the cyclic shift is different.

PUCCH format 1 is a format of the PUCCH in which the UCI is transmitted by modulation of a sequence for PUCCH format 1. The block of bits may be modulated by Binary Phase Shift Keying (BPSK) in a case that the number of bits included in the block of bits $M_{bit}$ is equal to 1, and a complex value modulation symbol d (0) may be generated. The block of bits may be modulated by Quadrature Phase Shift Keying (QPSK) in a case that the number of bits included in the block of bits $M_{bit}$ is equal to 2, and a complex value modulation symbol d (0) may be generated. In PUCCH format 1, the number of bits of the block of bits $M_{bit}$ may be less than 3. In PUCCH format 1, the number of OFDM symbols of the PUCCH may be 4 or greater.

In other words, PUCCH format 1 may be used to transmit 1 bit or 2 bits of HARQ-ACK, and/or (if any) the UCI including the scheduling request.

In a case that the terminal apparatus 1 transmits a HARQ-ACK by using PUCCH format 1, in a case that the HARQ-ACK PUCCH resource and the SR PUCCH resource in which transmission of PUCCH format 1 is performed overlap with each other in the time domain, the terminal apparatus 1 transmits a HARQ-ACK by using the PUCCH resource for the HARQ-ACK in a case that the scheduling request is a negative scheduling request for each of the scheduling request configurations with the overlapping SR PUCCH resource.

In a case that the terminal apparatus 1 transmits a HARQ-ACK by using PUCCH format 1, in a case that the HARQ-ACK PUCCH resource and the SR PUCCH resource in which transmission of PUCCH format 1 is performed overlap with each other in the time domain, the terminal apparatus 1 transmits a HARQ-ACK by using the PUCCH resource for the scheduling request in a case that the scheduling request is a positive scheduling request for the scheduling request configurations with the overlapping SR PUCCH resource. The base station apparatus 3 identifies for which scheduling request configuration the scheduling request has been transmitted, based on in which SR PUCCH resource the HARQ-ACK have been detected. Here, in a case that there are multiple scheduling request configurations for the positive scheduling request, the terminal apparatus 1 may transmit a HARQ-ACK by using the SR PUCCH resource corresponding to the scheduling request configuration with the highest priority among them.

In the present embodiment, the terminal apparatus 1 may perform transmission of PUCCH format 0 or PUCCH format 1 in the SR PUCCH resource PUCCH format 2 is a format of the PUCCH in which the UCI is transmitted by modulation of a sequence for PUCCH format 2. For the block of bits, an output sequence $z^{(p)}(n)$ for PUCCH format 2 may be generated, for example, based on being modulated. In PUCCH format 2, the number of bits of the block of bits $M_{bit}$ may be larger than 2. In PUCCH format 2, the number of OFDM symbols of the PUCCH may be 1 or 2. In PUCCH format 2, the number of OFDM symbols of the PUCCH may be 3.

PUCCH format 3 is a format of the PUCCH in which the UCI is transmitted by modulation of a sequence for PUCCH format 3. For the block of bits, an output sequence $z^{(p)}(n)$ for PUCCH format 3 may be generated, for example, based on being modulated. In PUCCH format 3, the number of bits of the block of bits $M_{bit}$ may be larger than 2. In PUCCH format 3, the number of OFDM symbols of the PUCCH may be 4 or greater.

PUCCH format 4 is a format of the PUCCH in which the UCI is transmitted by modulation of a sequence for PUCCH format 4. For the block of bits, an output sequence $z^{(p)}(n)$ for PUCCH format 3 may be generated, for example, based on being modulated. In PUCCH format 4, the number of bits of the block of bits $M_{bit}$ may be larger than 2. In PUCCH format 3, the number of OFDM symbols of the PUCCH may be 4 or greater. The number of bits for PUCCH format 4 may be less than the number of bits for PUCCH format 3. For example, the number of bits for PUCCH format 4 may be limited to not exceed a prescribed value.

In other words, PUCCH format 2, PUCCH format 3, and PUCCH format 4 are used to transmit more than two bits of HARQ-ACK, (if any) the scheduling request, and/or (if any) the UCI including the CSI. In other words, the UCI is configured with the number of bits more than two bits.

In the present embodiment, the terminal apparatus 1 need not transmit PUCCH format 2, PUCCH format 3, or PUCCH format 4 in the SR PUCCH resource.

Figure 5:
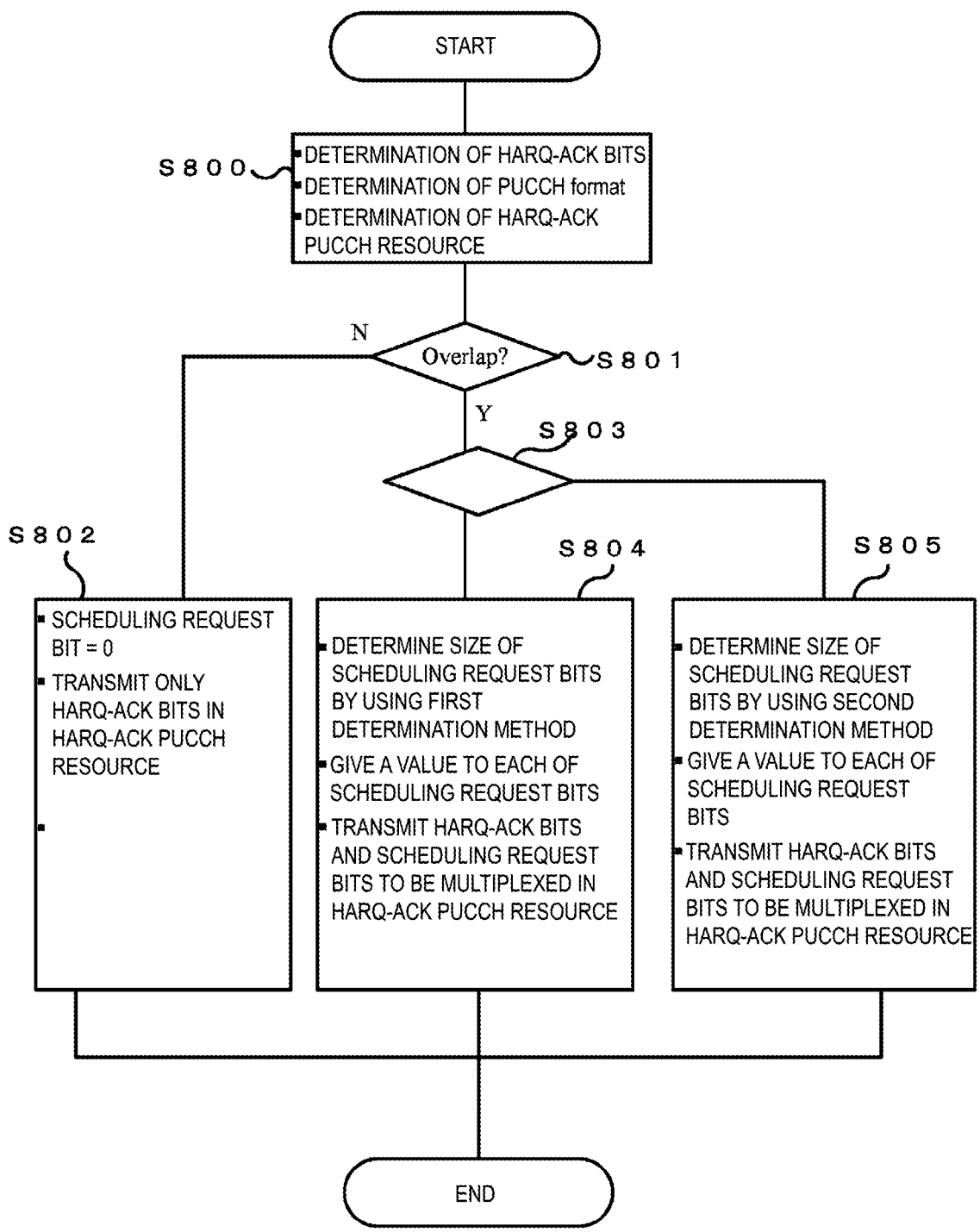
FIG. 5 is a flowchart for transmission of a HARQ-ACK and/or transmission of scheduling request bits according to the present embodiment.

Transmission of a HARQ-ACK and/or a scheduling request in a certain slot according to the present embodiment will be described below. FIG. 5 is a flowchart for transmission of a HARQ-ACK and/or transmission of scheduling request bits according to the present embodiment.

(S800) The terminal apparatus 1 may determine (generate) HARQ-ACK bits for the received downlink data (PDSCH). Note that the terminal apparatus 1 may set an ACK or a NACK for each of the HARQ-ACK bits, based on the decoding result of the downlink data. Subsequently, the terminal apparatus 1 may determine the PUCCH format and the HARQ-ACK PUCCH resource for transmission of the HARQ-ACK, at least based on higher layer signaling and/or a downlink grant. For example, the terminal apparatus 1 may determine any of PUCCH format 2, PUCCH format 3, and PUCCH format 4. Hereinafter, in the present embodiment, the HARQ-ACK PUCCH resource may be used for transmission of any of PUCCH format 2, PUCCH format 3, and PUCCH format 4.

(S801) The terminal apparatus 1 may determine which steps to select and then proceed, based on the first condition. The first condition is a condition whether the HARQ-ACK PUCCH resource used for transmission of the HARQ-ACK overlaps with the SR PUCCH resource in the time domain. Here, the HARQ-ACK PUCCH may be the resource determined in (S800). In other words, the terminal apparatus 1 proceeds to S802 in a case that the HARQ-ACK PUCCH resource and the SR PUCCH resource are not overlapped with each other. The terminal apparatus 1 proceeds to S803 in a case that the HARQ-ACK PUCCH resource and the SR PUCCH resource overlap with each other.

(S802) The terminal apparatus 1 determines the size of the scheduling request bits $O^{SR}$ to be 0, and transmits the HARQ-ACK bits in the HARQ-ACK PUCCH resource.

(S803) The terminal apparatus 1 selects the first determination method or the second determination method, based on the second condition. Here, (S804) corresponds to the first determination method. (S805) corresponds to the second determination method. The second condition may be higher layer signaling. The higher layer signaling is used to indicate whether or not to utilize any of the first determination method and the second determination method. The first determination method and the second determination method will be described later.

The second condition is a type of PUCCH format used to transmit a HARQ-ACK. In other words, which determination method is used is given in accordance with the type of PUCCH format. For example, in a case that the terminal apparatus 1 transmits the HARQ-ACK by using PUCCH format 2 or 3, the terminal apparatus 1 may select the first determination method (S804). In a case that the terminal apparatus 1 transmits the HARQ-ACK by using PUCCH format 4, the terminal apparatus 1 may select the second determination method (S805). For example, in a case that the terminal apparatus 1 transmits the HARQ-ACK by using PUCCH format 3, the terminal apparatus 1 may select the first determination method (S804). In a case that the terminal apparatus 1 transmits the HARQ-ACK by using PUCCH format 2, the terminal apparatus 1 may select the second determination method (S805).

The second condition may be a size of the HARQ-ACK bits determined in (S800). For example, in a case that the size of the HARQ-ACK bits exceeds a prescribed value, the terminal apparatus 1 selects the second determination method. For example, in a case that the size of the HARQ-ACK bit does not exceed a prescribed value, the terminal apparatus 1 selects the first determination method.

The second condition may be the number of scheduling request configurations with the SR PUCCH resource overlapped in the time domain with the HARQ-ACK PUCCH resource determined in (S800). For example, in a case that the number of scheduling request configurations with the SR PUCCH resource overlapped exceeds a prescribed value, the terminal apparatus 1 selects the second determination method. For example, in a case that the number of scheduling request configurations with the SR PUCCH resource overlapped does not exceed a prescribed value, the terminal apparatus 1 selects the first determination method. For example, the prescribed value may be 2. For example, the prescribed value may be 7.

(S804) The terminal apparatus 1 determines the size of the scheduling request bits $O^{SR}$ by using the first determination method. The terminal apparatus 1 sets '0' or '1' for each of the scheduling request bits. Here, each of the scheduling request bits may be used to indicate the information of the scheduling request for each of the scheduling request configurations with the SR PUCCH resource overlapped. Next, the terminal apparatus 1 may add the generated scheduling request bits to the HARQ-ACK bit sequence at its end, indicating the HARQ-ACK feedback. In other words, the scheduling request bits are multiplexed with the HARQ-ACK to be transmitted in the PUCCH resource for the HARQ-ACK.

(S805) The terminal apparatus 1 determines the size of the scheduling request bits $O^{SR}$ by using the second determination method. The terminal apparatus 1 sets '0' or '1' for each of the scheduling request bits. Here, in a case that the number of scheduling request configurations corresponding to the positive scheduling request among the scheduling request configurations is one, the scheduling request bits $O^{SR}$ may be at least used to indicate the scheduling request configuration corresponding to the positive scheduling request. In a case that the number of scheduling request configurations corresponding to the positive scheduling request among the scheduling request configurations is more than one, the scheduling request bits $O^{SR}$ may be used at least to indicate the scheduling request configuration having the highest priority among the scheduling request configurations corresponding to the positive scheduling request. Next, the terminal apparatus 1 may add the generated scheduling request bits to the HARQ-ACK bit sequence at its end, indicating the HARQ-ACK feedback. In other words, the scheduling request bits are multiplexed with the HARQ-ACK to be transmitted in the PUCCH resource for the HARQ-ACK.

Based on the transmission operation described above, the base station apparatus 3 can acquire the information of the scheduling request corresponding to each of the scheduling request configurations, based on the reception of UCI bits in the HARQ-ACK PUCCH resource. In other words, the base station apparatus 3 can determine whether the scheduling request is a positive scheduling request or a negative scheduling request for each of the scheduling request configurations, based on the reception of UCI bits in the HARQ-ACK PUCCH resource.

In other words, in the present embodiment, the terminal apparatus 1 may transmit the HARQ-ACK feedback by using the PUCCH resource for the HARQ-ACK. In a case that the HARQ-ACK PUCCH resource is overlapped in the time domain with the SR PUCCH resource configured from the higher layer signaling, the size of the scheduling request bits $O^{SR}$ may be given based on the number of scheduling request configurations with the SR PUCCH resource overlapped. In a case that the PUCCH resource does not overlap in the time domain with the SR PUCCH resource configured from the higher layer signaling, the size of the scheduling request bits $O^{SR}$ may be given as 0. In other words, in a case that the transmission of the scheduling request is configured from the higher layer signaling in the first time unit in which the transmission of the PUCCH format is performed, the size of the scheduling request bit $O^{SR}$ may be given based on the number of scheduling request configurations for the transmission of the scheduling request configured at the same time in the first time unit. In a case that the transmission of the scheduling request is not configured from the higher layer signaling in the first time unit in which the transmission of the PUCCH format is performed, the size of the scheduling request bits $O^{SR}$ may be given as 0. Here, the first time unit may be a period in which the transmission of the PUCCH format is performed in the time domain, and a period in which the HARQ-ACK PUCCH resource used for the transmission of the PUCCH format may be in the time domain. The HARQ-ACK PUCCH resource may be given based at least on the downlink grant and/or the higher layer signaling.

Figure 6:
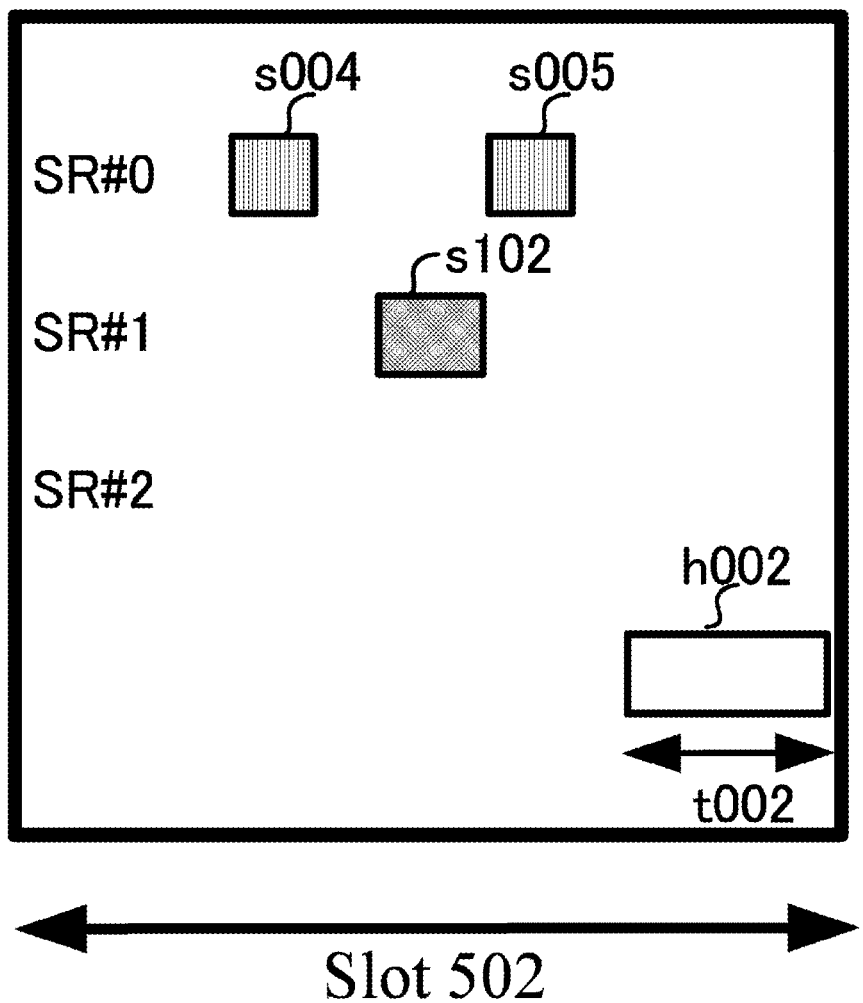
FIG. 6 is a diagram illustrating an example in which a HARQ-ACK PUCCH resource and an SR PUCCH resource do not overlap with each other in the time domain according to the present embodiment.
Figure 6:
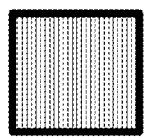
Figure 6:
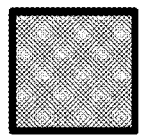
Figure 6:

FIG. 6 is a diagram illustrating an example in which a HARQ-ACK PUCCH resource and an SR PUCCH resource do not overlap with each other in the time domain according to the present embodiment.

In FIG. 6, two scheduling request configurations {SR #0, SR #1} are configured in the terminal apparatus 1 from higher layer signaling in the slot 502. In other words, each of the two scheduling request configurations configured from higher layer signaling corresponds to SR #0 and the SR #1. In the slot 502, SR #0 includes the SR PUCCH resources s004 and s005. In the slot 502, SR #1 includes the SR PUCCH resource s102. The resource h002 is the HARQ-ACK PUCCH resource in the slot 502. In the time domain, t002 is a time unit in which the transmission of the PUCCH format is performed.

For example, in the slot 502, the terminal apparatus 1 transmits the HARQ-ACK feedback on the resource h002 by using PUCCH format 2 or 3. In the time unit t002, the SR PUCCH resources {s004, s005} included in SR #0 and the SR PUCCH resource s102 included in SR #1 are not overlapped with the HARQ-ACK PUCCH resource in the time domain. In this case, the size of the scheduling request bits $O^{SR}$ may be given as 0. In this case, the terminal apparatus 1 may transmit only the HARQ-ACK by using the HARQ-ACK PUCCH resource h002 and PUCCH format 2 or PUCCH format 3.

Figure 7:
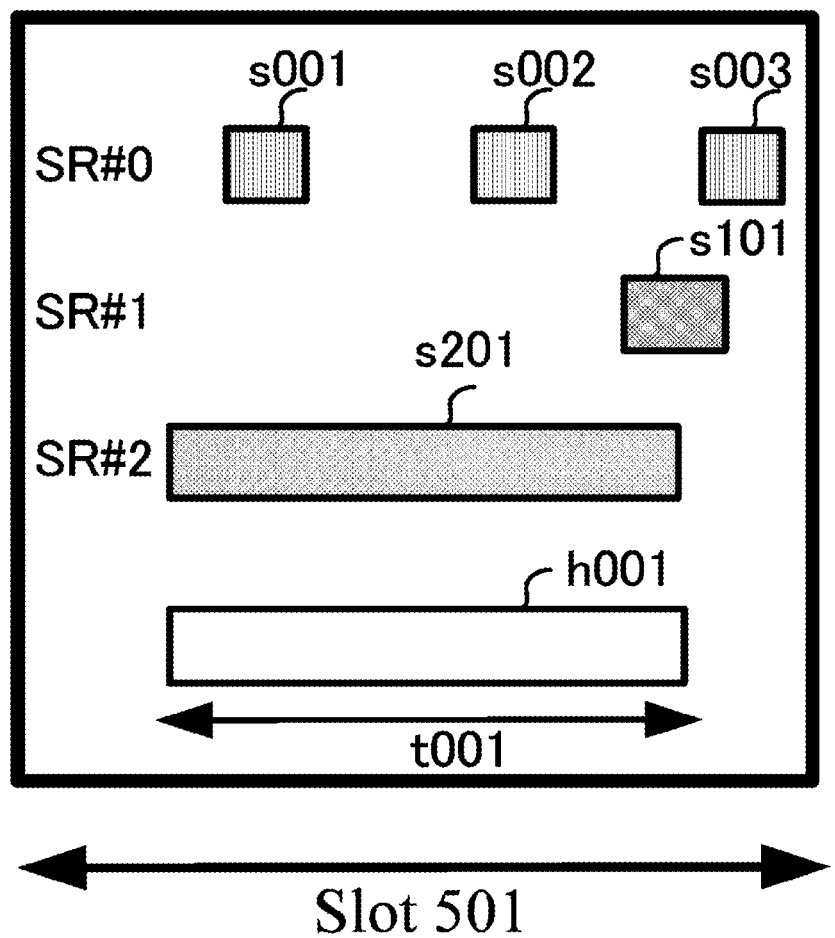
FIG. 7 is a diagram illustrating an example of determining a size of scheduling request bits in a case that a HARQ-ACK PUCCH resource and an SR PUCCH resource overlap with each other in the time domain according to the present embodiment.
Figure 7:
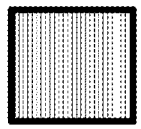
Figure 7:
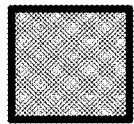
Figure 7:
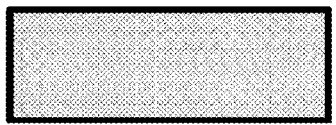
Figure 7:

Hereinafter, with reference to FIG. 7, the first determination method and the second determination method used to generate the scheduling request bits $O^{SR}$ in a case that the HARQ-ACK PUCCH resource and SR PUCCH resource overlap with each other in the time domain will be described. FIG. 7 is a diagram illustrating an example of determining a size of scheduling request bits in a case that a HARQ-ACK PUCCH resource and an SR PUCCH resource overlap with each other in the time domain according to the present embodiment.

In FIG. 7, three scheduling request configurations {SR #0, SR #1, SR #2} are configured in the terminal apparatus 1 from higher layer signaling in the slot 501. In other words, each of the three scheduling request configurations configured from higher layer signaling corresponds to SR #0, SR #1, and SR #2. In the slot 501, SR #0 includes the SR PUCCH resources s001, s002, and s003. In the slot 501, SR #1 includes the SR PUCCH resource s101. In the slot 501, SR #2 includes the SR PUCCH resource s201. The resource h001 is the HARQ-ACK PUCCH resource in the slot 501.

For example, in the slot 501, the terminal apparatus 1 transmits the HARQ-ACK feedback on the resource h001 by using PUCCH format 2 or 3. In the time domain, t001 is a time unit in which the transmission of PUCCH format 2 or PUCCH format 3 is performed. {s001, s002} included in SR #0, s101 included in SR #1, and s201 included in SR #2 overlap with the HARQ-ACK PUCCH resource h001 in the time domain. Here, s003 included in SR #0 does not overlap with the HARQ-ACK PUCCH resource h001 in the time domain.

In other words, in a case that the PUCCH resource for the transmission of the HARQ-ACK overlaps with the SR PUCCH resource configured from the higher layer signaling in the time domain, the size of the scheduling request bits $O^{SR}$ may be given by the number of scheduling request configurations with the SR PUCCH resource overlapped. The first determination method is a method in which the size of the scheduling request bits $O^{SR}$ is set to the number of scheduling request configurations with the SR PUCCH resource overlapped. In other words, in a case that the first determination method is used, the size of the scheduling request bits $O^{SR}$ is the same as the number of scheduling request configurations with the SR PUCCH resource overlapped. Each of the scheduling request bits may be used to indicate the information of the scheduling request for each of the scheduling request configurations with the SR PUCCH resource overlapped. In a case that the HARQ-ACK PUCCH resource and SR PUCCH resource overlap with each other in the time domain, the number of scheduling request configurations with the SR PUCCH resource overlapped is K. By using the first determination method, K bits of bitmap information is notified corresponding to the K scheduling request configurations. Each of information bits of the bitmap corresponds to one scheduling request configuration. For example, in the bitmap information, "1" may be set for the scheduling request configuration corresponding to the positive scheduling request, and "0" may be set for the scheduling request configuration corresponding to the negative scheduling request.

In FIG. 7, the number of scheduling request configurations with the SR PUCCH resource overlapped with the HARQ-ACK PUCCH resource h001 is three. In other words, the size of the scheduling request bits $O^{SR}$ determined by the first determination method is three bits ($O^{SR}$(0), $O^{SR}$(1), $O^{SR}$(2)) of information bits. In this case, each of the information bits of the scheduling request bits $O^{SR}$ corresponds to each of the scheduling request configurations. For example, $O^{SR}$(0) may correspond to SR #0. $O^{SR}$(1) may correspond to SR #1. $O^{SR}$(2) may correspond to SR #2. For SR #0, in a case that the scheduling request is the positive scheduling request (positive SR), $O^{SR}$(0) may be set to 1. In a case that the scheduling request is a negative scheduling request (negative SR) for SR #0, $O^{SR}$ (0) may be set to 0. Similarly, in a case that the scheduling request is a positive scheduling request (positive SR) for SR #1, $O^{SR}$ (1) may be set to 1, and in a case that the scheduling request is a negative scheduling request (negative SR), $O^{SR}$ (1) may be set to 0. In a case that the scheduling request is a positive scheduling request (positive SR) for SR #2, $O^{SR}$ (2) may be set to 1, and in a case that the scheduling request is a negative scheduling request (negative SR), $O^{SR}$ (2) may be set to 0. The terminal apparatus 1 may transmit the HARQ-ACK bits and the scheduling request bits by using the PUCCH resource h001 and PUCCH format 2 or PUCCH format 3. Thus, the base station apparatus 3 can identify the information of the scheduling request for each of the scheduling request configurations, based on the information of the bitmap transmitted.

The first determination method indicates the scheduling request for each of the K scheduling request configurations. The second determination method can set the size of $O^{SR}$ to be an appropriate size in a case that the number of scheduling request configurations with the SR PUCCH resource overlapped is greater than a prescribed number. The second determination method used for the generation of the scheduling request bits $O^{SR}$ will be described below.

The second determination method is a method in which the size of the scheduling request bits $O^{SR}$ is set to be a number less than the number of scheduling request configurations with the SR PUCCH resource overlapped. For example, the terminal apparatus 1 may transmit the HARQ-ACK feedback by using the PUCCH resource for the HARQ-ACK by using PUCCH format 2 or PUCCH format 3. In a case that the HARQ-ACK PUCCH resource and SR PUCCH resource overlap with each other in the time domain, the number of scheduling request configurations with the SR PUCCH resource overlapped is K. The size of the scheduling request bits $O^{SR}$ determined by using the second determination method is L bits. The value of L may be given as L=Ceiling ($\log_2$(K+1)). Here, Ceiling (*) is a function that rounds up the numerical value * and outputs an integer that is closest to * but larger than *. For example, in a case that the value of K is 3, L may be 2. For example, in a case that the value of K is 4, L may be 3. For example, in a case that the value of K is 7, L may be 3.

For the size L of the scheduling request bits $O^{SR}$, the number of combinations of code points is (2^L). (2^L) indicates 2 to the power of L. Hereinafter, the combination of the code points (2^L) and information of the scheduling request for the scheduling request configuration K will be described below.

FIG. 8 is a diagram illustrating an example of a correspondence table between information of a scheduling request and code points according to the present embodiment. Here, the information of the scheduling request is information indicating whether the scheduling request is a positive scheduling request or a negative scheduling request for each of the scheduling request configurations. In FIG. 8, the number K of the scheduling request configurations with the SR PUCCH resource overlapped in the time domain with the HARQ-ACK PUCCH resource may be 3. Each of the scheduling request configurations corresponds to SR #0, SR #1, and SR #2. For example, SR #0 with the lowest index may have the highest priority. In other words, the scheduling request configuration with the highest priority and the Negative SR may be mapped such that the Hamming distance between the first code point to which the scheduling request configuration with highest priority is mapped and the second code point to which the Negative SR is mapped is maximized. For example, as the Hamming distance between the first code point and the second code point is maximized, it would be expected to reduce the probability of detection errors for the first code point and the second code point. SR #2 with the largest index may have the lowest priority. In FIG. 8, the size L of the scheduling request bits $O^{SR}$ is two bits, and can correspond to four code points (four states). In FIG. 8, the scheduling request bits $O^{SR}$ are {$O^{SR}$ (0), $O^{SR}$ (1)}. In FIG. 8, 'Positive' means a positive scheduling request. 'Negative' means a negative scheduling request. 'Any' means that there may be any of a positive scheduling request and a negative scheduling request.

In FIG. 8(a), the number of scheduling request configurations corresponding to the positive scheduling request among the K scheduling request configurations is 0 or 1. For example, in a case that a scheduling request is triggered for multiple scheduling request configurations, the MAC layer may notify/indicate the physical layer to select the scheduling request configuration with the highest priority to signal the scheduling request. The physical layer may transmit a scheduling request for the notified scheduling request configuration, based on an indication from the MAC layer. In other words, the scheduling request is a positive scheduling request for the scheduling request configuration notified from the MAC layer. The scheduling request is a negative scheduling request for the other scheduling request configurations.

In FIG. 8(a), one of the four code points is used to indicate that the scheduling request is a negative scheduling request for each of the K scheduling request configurations. The other code points are used to indicate the scheduling request configuration corresponding to the positive scheduling request. In other words, the information indicating the scheduling request configuration corresponding to the positive scheduling request may be the code point. Here, using the information indicating the scheduling request configuration corresponding to the positive scheduling request to the code point may be selecting of the code point, based on the information indicating the scheduling request configuration corresponding to the positive scheduling request. The base station apparatus 3 can determine the information of the scheduling request for the scheduling request configuration, based on the code point notified from the terminal apparatus 1. For example, in FIG. 8(a), the $O^{SR}$ (0) $O^{SR}$ (1) set to "00" may be used to indicate that the scheduling request is a negative scheduling request for each of SR #0, SR #1, and SR #2. The $O^{SR}$ (0) $O^{SR}$ (1) set to "01" may be used to indicate that the scheduling request is a negative scheduling request for each of SR #0 and SR #1 and indicate that the scheduling request is a positive scheduling request for SR #2. The $O^{SR}$ (0) $O^{SR}$ (1) set to "10" may be used to indicate that the scheduling request is a negative scheduling request for each of SR #0 and SR #2 and indicate that the scheduling request is a positive scheduling request for SR #1. The $O^{SR}$ (0) $O^{SR}$ (1) set to "11" may be used to indicate that the scheduling request is a negative scheduling request for each of SR #1 and SR #2 and indicate that the scheduling request is a positive scheduling request for SR #0.

In FIG. 8(b), the number of scheduling request configurations corresponding to the positive scheduling request among the K scheduling request configurations may be 0, 1, or a number greater than 1. For example, in a case that a scheduling request is triggered for multiple scheduling request configurations, the MAC layer may notify/indicate the physical layer to signal a scheduling request for each of the multiple scheduling request configurations triggered.

The physical layer may transmit a scheduling request for the notified scheduling request configuration, based on an indication from the MAC layer. In other words, in the time domain of the HARQ-ACK PUCCH resource, the number of scheduling request configurations corresponding to the positive scheduling request may be multiple.

In FIG. 8(b), one of the four code points is used to indicate that the scheduling request is a negative scheduling request for each of SR #0, SR #1, and SR #2. The other code points are used to indicate the scheduling configuration with the highest priority among the scheduling request configurations corresponding to the positive scheduling request. In FIG. 8(b), the $O^{SR}(0) O^{SR}(1)$ set to "00" may be used to indicate that the scheduling request is a negative scheduling request for each of SR #0, SR #1, and SR #2. The $O^{SR}(0) O^{SR}(1)$ set to "01" may be used to indicate that the scheduling request is a positive scheduling request for SR #2, and indicate that the scheduling request is a negative scheduling request for each of SR #0 and SR #1 with a higher priority than the SR #2. The $O^{SR}(0) O^{SR}(1)$ set to "10" may indicate that the scheduling request is a positive scheduling request for the SR #1, may indicate that the scheduling request is a negative scheduling request for SR #0 with a higher priority than SR #1, and may not indicate the information of the scheduling request for SR #2 with a lower priority than SR #1. The $O^{SR}(0) O^{SR}(1)$ set to "11" may indicate that the scheduling request is a positive scheduling request for SR #0, and may not indicate the information of the scheduling request for SR #1 and SR #2 with a lower priority than SR #0. As a result, the base station apparatus 3 can know the scheduling request configuration with the highest priority among the scheduling request configurations for the positive scheduling request.

In a case that the number of bits of the HARQ-ACK feedback is less than or equal to a prescribed value, the size L of $O^{SR}$ may be 1 regardless of the number of scheduling request configurations with the SR PUCCH resource overlapped in the time domain with the HARQ-ACK PUCCH resource. The prescribed value may be, for example, 11 bits. In a case that the size L of $O^{SR}$ is equal to 1, the scheduling request associated with the logical channel with the highest priority may be transmitted. In a case that the size L of $O^{SR}$ is equal to 1, the scheduling request associated with the logical channel with the lowest priority may be transmitted.

As another aspect of the present embodiment, in a case that the terminal apparatus 1 transmits the HARQ-ACK feedback by using PUCCH format 4 and the HARQ-ACK PUCCH resource and that the HARQ-ACK PUCCH resource and the SR PUCCH resource overlap with each other in the time domain, the size of the scheduling request bits $O^{SR}$ may be given as 1, not based on the number of scheduling request configurations with the SR PUCCH resource overlapped. In other words, even in a case that the number of scheduling request configurations with the SR PUCCH resources overlapped is greater than one, the terminal apparatus 1 may set the size of the scheduling request bits $O^{SR}$ to 1.

In a case that the terminal apparatus 1 transmits the HARQ-ACK feedback by using the HARQ-ACK PUCCH resource and PUCCH format 2 or 3, and that the HARQ-ACK PUCCH resource and the SR PUCCH resource overlap in the time domain, the size of the scheduling request bits $O^{SR}$ may be given based on the number of scheduling request configurations with the SR PUCCH resource overlapped. In other words, even in a case that the number of scheduling request configurations having the SR PUCCH resources overlapped is greater than one, the terminal apparatus 1 may set the size of the scheduling request bits $O^{SR}$ to a bit larger than 1.

As another aspect of the present embodiment, another example of determining the size of the scheduling request bit will be described in a case that the terminal apparatus 1 transmits the HARQ-ACK feedback by using the HARQ-ACK PUCCH resource, and that the HARQ-ACK PUCCH resource and the SR PUCCH resource overlap with each other in the time domain.

As described above, the first determination method is a method in which the size of the scheduling request bits $O^{SR}$ is set to the number of scheduling request configurations having the SR PUCCH resource overlapped with the HARQ-ACK PUCCH resource in the time domain. The first determination method may be a method in which the size of the scheduling request bits $O^{SR}$ is set to the number of scheduling request configurations configured from higher layer signaling regardless of the number of scheduling request configurations with the SR PUCCH resource overlapped with the HARQ-ACK PUCCH resource in the time domain.

The number of the scheduling request configurations may be given from higher layer signaling for each PUCCH format.

The first determination method may be a method in which the size of the scheduling request bits $O^{SR}$ is set based at least on the higher layer signaling regardless of the number of scheduling request configurations having the SR PUCCH resource overlapped with the HARQ-ACK PUCCH resource in the time domain.

For example, N scheduling request configurations are configured for the terminal apparatus 1 from higher layer signaling. The size of the scheduling request bits $O^{SR}$ multiplexed with the HARQ-ACK sequence may be set to N. Each of the $O^{SR}$ information bits of corresponds to one of the scheduling request configurations configured from the higher layer signaling. The $O^{SR}$ information bits and the scheduling request configuration are mapped in a one-to-one basis. Each of the scheduling request bits $O^{SR}$ may be used to indicate the information of the scheduling request for each of the scheduling request configurations configured from the higher layer signaling. In other words, the terminal apparatus 1 may notify the base station apparatus 3 of the information of the scheduling request for each of N scheduling request configurations by using N bits of bitmap format. For example, among the scheduling request configurations having the SR PUCCH resource overlapped in the time domain with the HARQ-ACK PUCCH resource, the terminal apparatus 1 may set the information bits corresponding to the scheduling request configuration corresponding to the positive scheduling request to "1", and may set the information bits corresponding to the scheduling request configuration corresponding to the negative scheduling request to "0". The terminal apparatus 1 may set the information bits corresponding to the scheduling request configuration without the SR PUCCH resource overlapped in the time domain with the HARQ-ACK PUCCH resource to "0".

Figure 9:
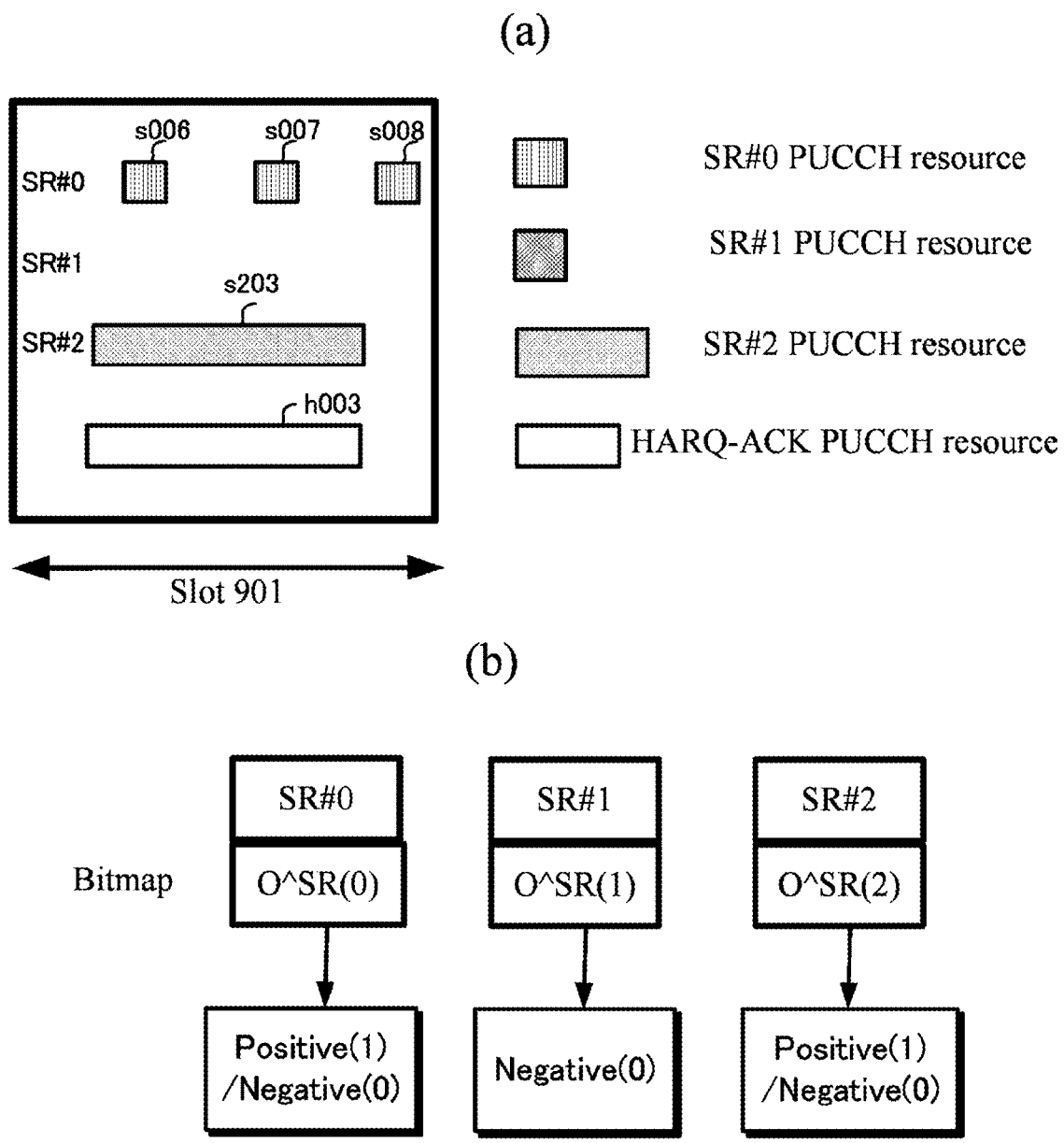
FIG. 9 is a diagram illustrating another example of determining a size of scheduling request bits in a case that a HARQ-ACK PUCCH resource and an SR PUCCH resource overlap with each other in the time domain according to the present embodiment.

FIG. 9 is a diagram illustrating another example of determining a size of scheduling request bits in a case that a HARQ-ACK PUCCH resource and an SR PUCCH resource overlap with each other in the time domain according to the present embodiment.

In FIG. 9, three scheduling request configurations {SR #0, SR #1, SR #2} are configured in the terminal apparatus 1 from higher layer signaling. In other words, the number N of scheduling request configurations configured from the higher layer signaling is 3. In the slot 901, SR #0 includes the SR PUCCH resources s006, s007, and s008. In the slot 901, SR #1 does not include an SR PUCCH resource. In the slot 901, SR #2 includes the SR PUCCH resource s203. The resource h003 is the HARQ-ACK PUCCH resource in the slot 901. {s006, s007} included in SR #0 and s203 included in SR #2 overlap with the HARQ-ACK PUCCH resource h003 in the time domain. In other words, the number K of scheduling request configurations with the SR PUCCH resource overlapped with the HARQ-ACK PUCCH resource is 2.

In FIG. 9(*a*), the terminal apparatus 1 sets information bits $O^{SR}$ (0) corresponding to SR #0 to either "1" or "0", based on whether the scheduling request is a positive scheduling request or a negative scheduling request for SR #0. The terminal apparatus 1 may set information bits $O^{SR}$ (1) corresponding to SR #1 without the SR PUCCH resource overlapped in the time domain with the HARQ-ACK PUCCH resource, to "0". The terminal apparatus 1 sets information bits $O^{SR}$ (2) corresponding to SR #2 to either "1" or "0", based on whether the scheduling request is a positive scheduling request or a negative scheduling request for SR #2. Next, the terminal apparatus 1 may notify the base station apparatus 3 of the information of the scheduling request for each of the three scheduling request configurations, by using a bitmap format such as that illustrated in FIG. 9(*b*). For example, the terminal apparatus 1 multiplexes the bitmap information (1, 0, 0) with the HARQ-ACK by using the HARQ-ACK PUCCH resource and transmits it to the base station apparatus 3. Based on the bitmap information (1, 0, 0), the base station apparatus 3 can determine that the scheduling request is a positive scheduling request for SR #0 and determine that the scheduling request is a negative scheduling request for SR #2.

In the present aspect, the second determination method is a method in which the size of the scheduling request bits $O^{SR}$ is set to a number less than the number N of scheduling request configurations configured from the higher layer signaling. In other words, the size of the scheduling request bits $O^{SR}$ is associated with the number of scheduling request configurations configured from the higher layer signaling regardless of the number K of the scheduling request configurations having the SR PUCCH resource overlapped with the HARQ-ACK PUCCH resource in the time domain. For example, N scheduling request configurations are configured for the terminal apparatus 1 from the higher layer signaling. The size L of the scheduling request bits $O^{SR}$ multiplexed with the HARQ-ACK sequence may be given by L=Ceiling ($\log_2$ (N+1)). For example, in a case that the value of N is 3, L may be 2. For example, in a case that the value of N is 4, may be 3. For example, in a case that the value of K is 7, L may be 3.

Next, the second determination method according to the present aspect will be described. Three scheduling request configurations {SR #0, SR #1, SR #2} are configured in the terminal apparatus 1 from higher layer signaling. Here, the value of N is 3. The size L of the scheduling request bits $O^{SR}$ multiplexed with the HARQ-ACK sequence may be given as 2, based on L=Ceiling ($\log_2$ (3+1)). Four combinations (patterns, states) are configured from two bits of information bits. Next, a description will be given with reference to FIG. 8(*a*). The terminal apparatus 1 may make the scheduling request information to be four code points for the three scheduling request configurations. Here, making the information of the scheduling request to be a code point may be selecting a code point, based on the information of the scheduling request. For example, the terminal apparatus 1 may make the information indicating that the scheduling request is a negative scheduling request for the three scheduling request configurations to be a code point (for example, "00"). For example, the terminal apparatus 1 may make the information indicating that the scheduling request is a positive scheduling request for SR #2 to be a code point (for example, "01"). For example, the terminal apparatus 1 may make the information indicating that the scheduling request is a positive scheduling request for SR #1 to be a code point (for example, "10"). For example, the terminal apparatus 1 may make the information indicating that the scheduling request is a positive scheduling request for SR #0 to be a code point (for example, "11").

In a case that the value of K and the value of N are the same, the terminal apparatus 1 may indicate the information of the scheduling request for the scheduling request configuration configured from the higher layer signaling by using FIG. 8. Next, the information of the scheduling request indicated by the code point will be described in a case that the value of K is smaller than the value of N. For example, with reference to FIG. 10(*a*), the value of K is 2, in other words, the number of scheduling request configurations (SR #0, SR #2) with the SR PUCCH resource overlapped in the time domain with the HARQ-ACK PUCCH resource used for transmission of the HARQ-ACK is 2. The SR PUCCH resource included in SR #1 is not overlapped with the HARQ-ACK PUCCH resource in the time domain. In this case, the interpretation of the information of the scheduling request indicated by the code points may be changed. For example, as illustrated in FIG. 10(*a*), the terminal apparatus 1 may make the information indicating that the scheduling request is a negative scheduling request for SR #0 and SR #2 to be a code point (for example, "00"). For example, the terminal apparatus 1 may make the information indicating that the scheduling request is a positive scheduling request for SR #2 to be a code point (for example, "01"). For example, the terminal apparatus 1 may make the information indicating that the scheduling request is a positive scheduling request for SR #0 to be a code point (for example, "10"). Here, the terminal apparatus 1 may use three code points to indicate the information of the scheduling request for two scheduling request configurations (SR #0, SR #2). Then, the excess one code point "11" may not be used to indicate the information of the scheduling request. In other words, the terminal apparatus 1 may not notify the base station apparatus 3 of the code point set to "11". The terminal apparatus 1 may reinterpret the code point set to "11". For example, the terminal apparatus 1 may make the information indicating that the scheduling request is a positive scheduling request for each of SR #0 and SR #2 to be a code point ("11"). As illustrated in FIG. 10(*b*), the three code points may be used to indicate the information of the scheduling request for SR #0 and SR #2. The three code points may indicate that the scheduling request is a negative scheduling request for SR #1. Then, the excess one code point "11" may not be used to indicate the information of the scheduling request. In this way, the base station apparatus 3 can determine the information of the scheduling request for the scheduling request configuration, based on the code point notified from the terminal apparatus 1.

The apparatus configuration of the terminal apparatus 1 according to the present invention will be described below.

Figure 11:
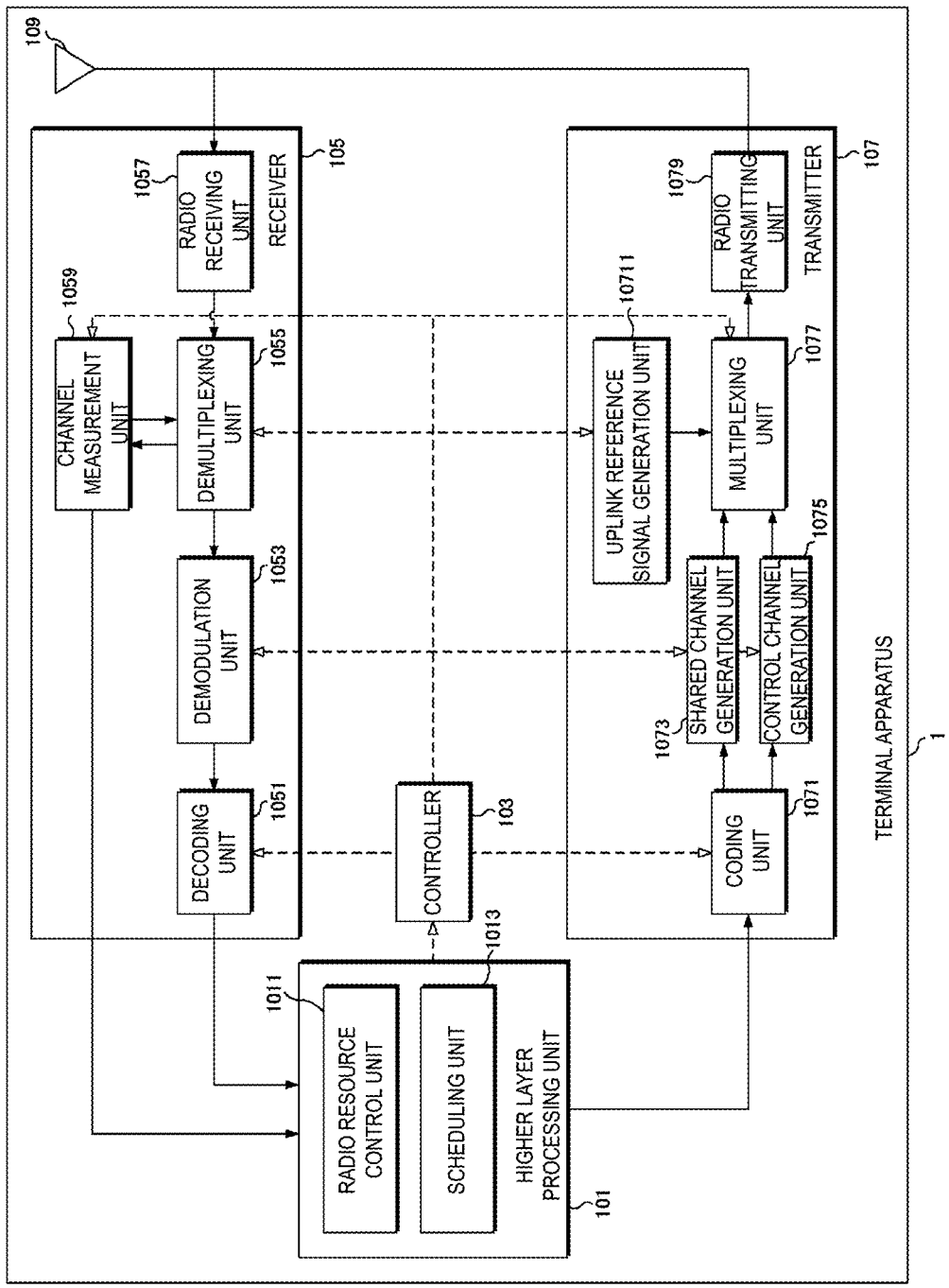
FIG. 11 is a schematic block diagram illustrating a configuration of a terminal apparatus 1 according to the present embodiment.

FIG. 11 is a schematic block diagram illustrating a configuration of the terminal apparatus 1 according to the present embodiment. As illustrated, the terminal apparatus 1 includes at least one of a higher layer processing unit 101, a controller 103, a receiver 105, a transmitter 107, and a transmit and receive antenna 109. The higher layer processing unit 101 includes at least one of a radio resource control unit 1011, and a scheduling unit 1013. The receiver 105 includes at least one of a decoding unit 1051, a demodulation unit 1053, a demultiplexing unit 1055, a radio receiving unit 1057, and a channel measurement unit 1059. The transmitter 107 includes at least one of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs, to the transmitter 107, the uplink data generated by a user operation or the like. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. The higher layer processing unit 101 generates control information for control of the receiver 105 and the transmitter 107, based on downlink control information received in the control channel and the like, and outputs the generated information to the controller 103.

The radio resource control unit 1011 included in the higher layer processing unit 101 manages various configuration information of the terminal apparatus 1. For example, the radio resource control unit 1011 manages the configured serving cell. The radio resource control unit 1011 generates information to be mapped to each uplink channel, and outputs the generated information to the transmitter 107. In a case that decoding of the received downlink data is successful, the radio resource control unit 1011 generates an ACK and outputs the ACK to the transmitter 107, and in a case that decoding of the received downlink data is failed, the radio resource control unit 1011 generates a NACK and outputs the NACK to the transmitter 107.

The scheduling unit 1013 included in the higher layer processing unit 101 stores downlink control information received via the receiver 105. The scheduling unit 1013 controls the transmitter 107 via the controller 103 so as to transmit the PUSCH in accordance with the received uplink grant in the subframe four subframes after the subframe in which the uplink grant has been received. The scheduling unit 1013 controls the receiver 105 via the controller 103 so as to receive the shared channel according to the received downlink grant in the subframe in which the downlink grant has been received.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the decoded information to the higher layer processing unit 101.

The radio receiving unit 1057 performs orthogonal demodulation on the downlink signal received via the transmit and receive antenna 109, and converts the orthogonally-demodulated analog signal to a digital signal. For example, the radio receiving unit 1057 may perform Fast Fourier Transform (FFT) on the digital signal to extract a signal in the frequency domain.

The demultiplexing unit 1055 separates the extracted signals into the control channel, the shared channel, and the reference signal channel. The demultiplexing unit 1055 outputs the separated reference signal channel to the channel measurement unit 1059.

The demodulation unit 1053 demodulates the control channel and the shared channel with respect to a modulation scheme such as QPSK, 16 Quadrature Amplitude Modulation (QAM), 64 QAM, and the like, and outputs the result of the demodulation to the decoding unit 1051.

The decoding unit 1051 decodes downlink data and outputs the decoded downlink data to the higher layer processing unit 101. The channel measurement unit 1059 calculates a downlink channel estimate from the reference signal channel and outputs the calculated downlink channel estimate to the demultiplexing unit 1055. The channel measurement unit 1059 calculates the channel state information, and outputs the channel state information to the higher layer processing unit 101.

The transmitter 107 generates the uplink reference signal channel according to the control signal input from the controller 103, codes and modulates the uplink data and the uplink control information input from the higher layer processing unit 101, multiplexes the shared channel, the control channel, and the reference signal channel, and transmits the result of the multiplexing to the base station apparatus 3 through the transmit and receive antenna 109.

The coding unit 1071 codes the uplink control information and the uplink data input from the higher layer processing unit 101 and outputs the coded bits to the shared channel generation unit 1073 and/or the control channel generation unit 1075.

The shared channel generation unit 1073 may modulate the coded bits input from the coding unit 1071 to generate a modulation symbol, and generate the shared channel by performing DFT on the modulation symbol and output the generated shared channel to the multiplexing unit 1077. The shared channel generation unit 1073 may modulate the coded bits input from the coding unit 1071 to generate the shared channel and output the generated shared channel to the multiplexing unit 1077.

The control channel generation unit 1075 generates the control channel, based on the coded bits input from the coding unit 1071 and/or SR, and outputs the generated control channel to the multiplexing unit 1077.

The uplink reference signal generation unit 10711 generates the uplink reference signal, and outputs the generated uplink reference signal to the multiplexing unit 1077.

The multiplexing unit 1077 multiplexes a signal input from the shared channel generation unit 1073 and/or a signal input from the control channel generation unit 1075, and/or the uplink reference signal input from the uplink reference signal generation unit 10711 to the uplink resource element for each transmit antenna port in accordance with the control signal input from the controller 103.

The radio transmitting unit 1079 performs Inverse Fast Fourier Transform (IFFT) on a signal resulting from the multiplexing, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

The apparatus configuration of the base station apparatus 3 according to the present invention will be described below.

Figure 12:
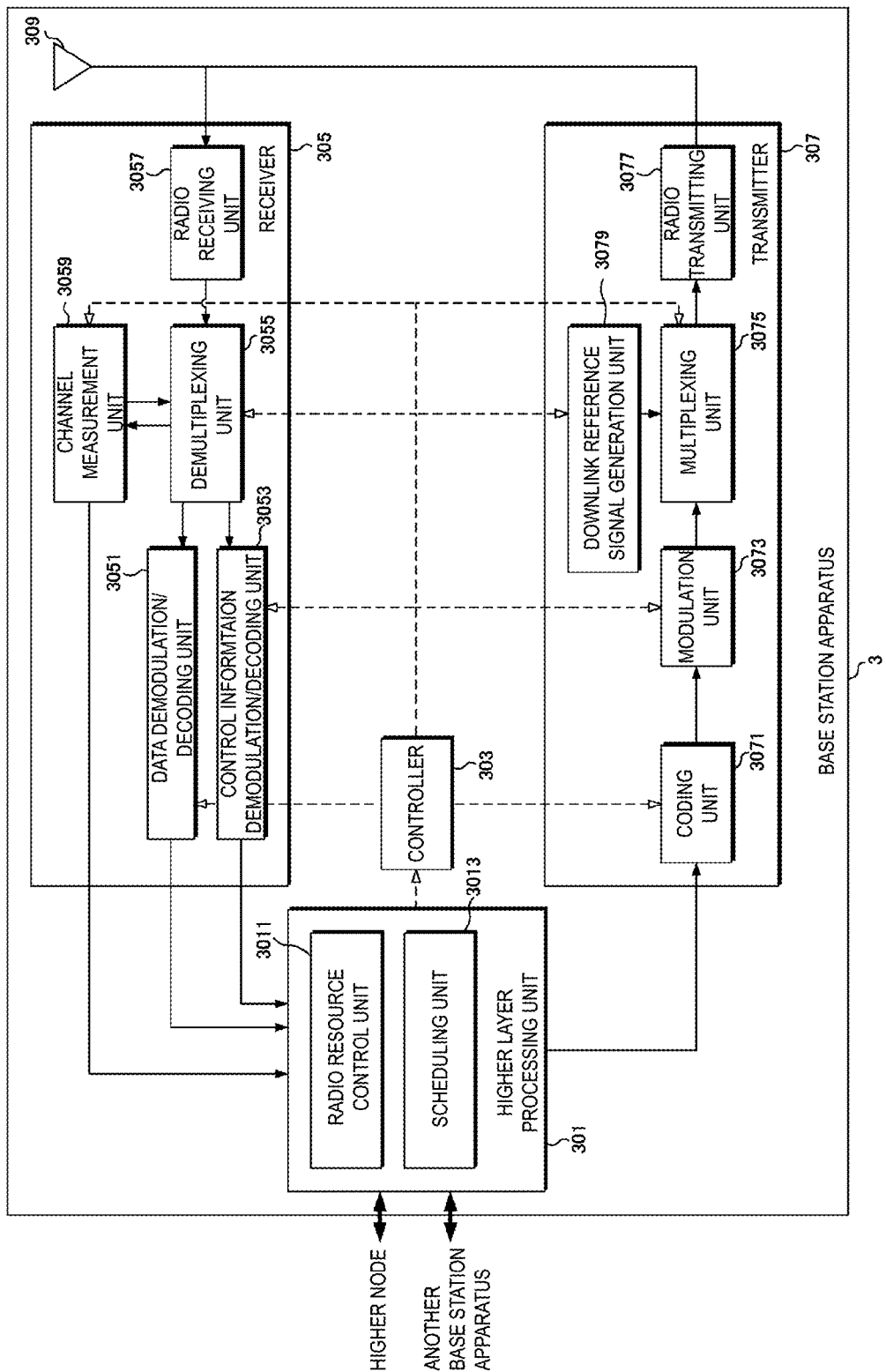
FIG. 12 is a schematic block diagram illustrating a configuration of a base station apparatus 3 according to the present embodiment.

FIG. 12 is a schematic block diagram illustrating a configuration of the base station apparatus 3 according to the present embodiment. As is illustrated, the base station apparatus 3 includes a higher layer processing unit 301, a controller 303, a receiver 305, a transmitter 307, and a transmit and receive antenna 309. The higher layer processing unit 301 includes a radio resource control unit 3011 and a scheduling unit 3013. The receiver 305 includes a data demodulation/decoding unit 3051, a control information demodulation/decoding unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of a Medium Access Control (MAC) layer, a Packet Data Convergence Protocol (PDCP) layer, a Radio Link Control (RLC) layer, and a Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data mapped to the downlink shared channel, RRC signaling, and MAC Control Element (CE), and outputs a signal resulting from the generation or the acquirement to the HARQ control unit 3013. The radio resource control unit 3011 manages various configuration information for each of the terminal apparatuses 1. For example, the radio resource control unit 3011 manages the serving cell configured for the terminal apparatus 1, and the like.

The scheduling unit 3013 included in the higher layer processing unit 301 manages radio resources of the shared channel and the control channel allocated to the terminal apparatus 1. In a case that a radio resource of the shared channel is allocated to the terminal apparatus 1, the scheduling unit 3013 generates the uplink grant indicating the allocation of the radio resource of the shared channel, and outputs the generated uplink grant to the transmitter 307.

Based on the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 orthogonally demodulates the uplink signal received via the transmit and receive antenna 309, and converts the orthogonally-demodulated analog signal to a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes the signal input from the radio receiving unit 3057 into signals such as the control channel, the shared channel, the reference signal channel, and the like. Note that the demultiplexing is performed based on radio resource allocation information that is determined in advance by the base station apparatus 3 by using the radio resource control unit 3011 and that is included in the uplink grant notified to each of the terminal apparatuses 1. The demultiplexing unit 3055 makes a compensation of channels of the control channel and the shared channel from the channel estimate input from the channel measurement unit 3059. The demultiplexing unit 3055 outputs the separated reference signal channel to the channel measurement unit 3059.

The demultiplexing unit 3055 acquires the modulation symbol of the uplink data and the modulation symbol of the uplink control information (HARQ-ACK) from the separated control channel and the shared channel. The demultiplexing unit 3055 outputs the modulation symbol of the uplink data acquired from the shared channel signal to the data demodulation/decoding unit 3051. The demultiplexing unit 3055 outputs the modulation symbol of the uplink control information (HARQ-ACK) acquired from the control channel or the shared channel to the control information demodulation/decoding unit 3053.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the higher layer processing unit 301.

The control information demodulation/decoding unit 3053 decodes a HARQ-ACK from the modulation symbol of the HARQ-ACK input from the demultiplexing unit 3055. The control information demodulation/decoding unit 3053 outputs the decoded HARQ-ACK to the higher layer processing unit 301.

The transmitter 307 generates the downlink reference signal according to the control signal input from the controller 303, codes and modulates the downlink control information and the downlink data input from the higher layer processing unit 301, multiplexes the control channel, the shared channel, and the reference signal channel, and transmits a signal to the terminal apparatus 1 through the transmit and receive antenna 309.

The coding unit 3071 performs coding of the downlink control information and the downlink data input from the higher layer processing unit 301. The modulation unit 3073 modulates the coded bits input from the coding unit 3071, in compliance with the modulation scheme such as BPSK, QPSK, 16 QAM, or 64 QAM. The modulation unit 3073 may apply precoding to the modulation symbol. The precoding may include a transmission precode. Note that the precoding may be a multiplication (application) by a precoder.

The downlink reference signal generation unit 3079 generates a downlink reference signal. The multiplexing unit 3075 multiplexes the modulation symbol of each channel and the downlink reference signal to generate a transmission symbol.

The multiplexing unit 3075 may apply precoding to the transmission symbol. The precoding which the multiplexing unit 3075 applies to the transmission symbol may be applied to the downlink reference signal and/or the modulation symbol. The precoding applied to the downlink reference signal and the precoding applied to the modulation symbol may be the same or different.

The radio transmitting unit 3077 performs Inverse Fast Fourier Transform (IFFT) on the multiplexed transmission symbol, and the like to generate a time symbol. The radio transmitting unit 3077 performs the modulation in compliance with an OFDM scheme on the time symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, generates a Carrier signal (Carrier, RF signal, and the like). The radio transmitting unit 3077 performs power amplification on the carrier signal and transmits the carrier signal to the transmit and receive antenna 309.

Hereinafter, various aspects of the terminal apparatus and the base station apparatus according to the present embodiment will be described.

(1) To accomplish the object described above, aspects of the present invention are contrived to provide the following measures. Specifically, a first aspect of the present invention is a terminal apparatus including: a receiver 105 configured to receive higher layer signaling used for configuration of multiple scheduling request configurations; and a transmitter 107 configured to transmit HARQ-ACK bits and scheduling request bits by using a PUCCH format and a HARQ-ACK PUCCH resource. Each of the multiple scheduling request configurations corresponds to one or more logical channels. Each of the multiple scheduling request configurations includes an SR PUCCH resource. The scheduling request bits are added to a sequence of the HARQ-ACK bits. In a case that the HARQ-ACK PUCCH resource and the SR PUCCH resource overlap with each other in a time domain, a value of a size L of the scheduling request bits is given based on a number K of scheduling request configurations with the overlapping SR PUCCH resource.

(2) In the first aspect of the present invention, in a case that a value of the L is given as a same value as a value of the K, each of the scheduling request bits is used to indicate information of a scheduling request for each of the K scheduling request configurations, and the information of the scheduling request is information indicating whether the scheduling request is a positive scheduling request or a negative scheduling request.

(3) In the first aspect of the present invention, in a case that a value of the L is given as a value smaller than a value of the K, different code points are selected to indicate which scheduling request configuration corresponds to a positive scheduling request within the K scheduling request configurations.

(4) A second aspect of the present invention is a base station apparatus including: a transmitter 307 configured to transmit higher layer signaling used for configuration of multiple scheduling request configurations; and a receiver 305 configured to receive HARQ-ACK bits and scheduling request bits by using a PUCCH format and a HARQ-ACK PUCCH resource. Each of the multiple scheduling request configurations corresponds to one or more logical channels. Each of the multiple scheduling request configurations includes an SR PUCCH resource. The scheduling request bits are added to a sequence of the HARQ-ACK bits. In a case that the HARQ-ACK PUCCH resource and the SR PUCCH resource overlap with each other in a time domain, a value of a size L of the scheduling request bits OSR is given based on a number K of scheduling request configurations with the overlapping SR PUCCH resource.

(5) In the second aspect of the present invention, in a case that a value of the L is given as a same value as a value of the K, each of the scheduling request bits is used to indicate information of a scheduling request for each of the K scheduling request configurations, and the information of the scheduling request is information indicating whether the scheduling request is a positive scheduling request or a negative scheduling request.

(6) In the second aspect of the present invention, in a case that a value of the L is given as a value smaller than a value of the K, different code points are selected to indicate which scheduling request configuration corresponds to a positive scheduling request within the K scheduling request configurations.

Each of a program running on the terminal apparatus 1 and the base station apparatus 3 according to the present invention may be a program that controls a Central Processing Unit (CPU) and the like, such that the program causes a computer to operate in such a manner as to realize the functions of the above-described embodiment according to the present invention. The information handled in these devices is temporarily stored in a Random Access Memory (RAM) while being processed.

Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. The "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

The terminal apparatus 1 or the base station apparatus 3 according to the above-described embodiment may be realized as an aggregation (apparatus group) including multiple apparatuses. Each of the apparatuses constituting such an apparatus group may include at least one of each function or each functional block of the terminal apparatus 1 or the base station apparatus 3 according to the above-described embodiment. The apparatus group is required to have each general function or each general functional block of the terminal apparatus 1 or the base station apparatus 3. The terminal apparatus 1 or the base station apparatus 3 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). The base station apparatus 3 according to the above-described embodiment may have at least one of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-176818 filed on Sep. 14, 2017, which is incorporated herein by reference in its entirety.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit
303 Controller
305 Receiver
307 Transmitter
309 Transmit and receive antenna
3011 Radio resource control unit
3013 Scheduling unit
3051 Data demodulation/decoding unit
3053 Control information demodulation/decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit

The invention claimed is:

1. A terminal apparatus comprising:
a receiver configured to receive a higher layer parameter for configuring one scheduling request (SR) configuration; and
a transmitter configured to transmit hybrid automatic repeat request acknowledgement (HARQ-ACK) bits and SR bits using a physical uplink control channel (PUCCH) resource for transmission of a HARQ-ACK, wherein:
the one SR configuration configures an SR PUCCH resource,
a value of a size L of the SR bits is given based on the following equation:

$\log_2(K+1)$, where K is a number of SR configurations each corresponding to at least one SR PUCCH resource that overlaps with the PUCCH resource in a time domain, the SR bits are appended to the HARQ-ACK bits, and in response to determining that one SR PUCCH resource for the one SR configuration overlaps with the PUCCH resource, the value of L is given based on K=1.

2. A terminal apparatus according to claim 1, wherein in response to determining that more than one SR PUCCH resource for the one SR configuration overlaps with the PUCCH resource, the value of L is given based on K=1.

3. A base station apparatus comprising:

a transmitter configured to transmit a higher layer parameter for configuring one scheduling request (SR) configuration; and a receiver configured to receive hybrid automatic repeat request acknowledgement (HARQ-ACK) bits and SR bits using a physical uplink channel (PUCCH) resource for reception of a HARQ-ACK, wherein:

the one SR configuration configures an SR PUCCH resource, a value of a size L of the SR bits is given based on the following equation:

$\log_2(K+1)$, where K is a number of SR configurations each corresponding to at least one SR PUCCH resource that overlaps with the PUCCH resource in a time domain, the SR bits are appended to the HARQ-ACK bits, and in response to determining that one SR PUCCH resource for the one SR configuration overlaps with the PUCCH resource, the value of L is given based on K=1.

4. A base station apparatus according to claim 3, wherein in response to determining that more than one SR PUCCH resource for the one SR configuration overlaps with the PUCCH resource, the value of L is given based on K=1.

* * * * *